United States Patent
Fujimoto et al.

(10) Patent No.: US 10,689,530 B2
(45) Date of Patent: Jun. 23, 2020

(54) PRESSURE-SENSITIVE ADHESIVE FILM

(71) Applicant: RIKEN TECHNOS CORPORATION, Tokyo (JP)

(72) Inventors: Jun Fujimoto, Tokyo (JP); Nozomu Washio, Tokyo (JP)

(73) Assignee: RIKEN TECHNOS CORPORATION (JP)

( * ) Notice: Subject to any disclaimer, the term of this patent is extended or adjusted under 35 U.S.C. 154(b) by 157 days.

(21) Appl. No.: 15/516,312

(22) PCT Filed: Sep. 11, 2015

(86) PCT No.: PCT/JP2015/075797
§ 371 (c)(1),
(2) Date: Mar. 31, 2017

(87) PCT Pub. No.: WO2016/052137
PCT Pub. Date: Apr. 7, 2016

(65) Prior Publication Data
US 2017/0306188 A1 Oct. 26, 2017

(30) Foreign Application Priority Data
Oct. 2, 2014 (JP) .................. 2014-203582

(51) Int. Cl.
C08J 7/04 (2020.01)
C09D 133/10 (2006.01)
(Continued)

(52) U.S. Cl.
CPC .................. C09D 7/40 (2018.01); B32B 7/04 (2013.01); B32B 7/12 (2013.01); B32B 27/00 (2013.01);
(Continued)

(58) Field of Classification Search
CPC .............. B32B 27/365; B32B 2250/03; B32B 2379/08
See application file for complete search history.

(56) References Cited

U.S. PATENT DOCUMENTS 4,753,827 A 6/1988 Yoldas et al.
4,982,014 A 1/1991 Freitag et al.
(Continued)

FOREIGN PATENT DOCUMENTS

CN 1089627 A 7/1994
EP 2733156 A1 5/2014
(Continued)

OTHER PUBLICATIONS

Machine translation 2012-133314 (Year: 2012).*
(Continued)

Primary Examiner — Alexandre F Ferre
(74) Attorney, Agent, or Firm — Bracewell LLP; Brad Y. Chin

(57) ABSTRACT

Embodiments provide a pressure-sensitive adhesive film having (α) a poly(meth)acrylimide-based resin film layer and (γ) a pressure-sensitive adhesive agent layer in that order from the surface layer side and having a total light transmittance of 80% or higher. The pressure-sensitive adhesive film may further have (δ) a hard coat layer on the surface layer side of the poly(meth)acrylimide-based resin film layer (α). This hard coat layer (δ) may comprise an active energy ray-curable resin composition that contains (A) 100 parts by mass of a polyfunctional (meth)acrylate; (B) 0.2-4 parts by mass of a compound having an alkoxysilyl group and a (meth)acryloyl group; (C) 0.05-3 parts by mass of organic titanium; and (D) 5-100 parts by mass of fine particles having an average particle diameter of 1-300 nm. This active
(Continued)

energy ray-curable resin composition may further contain (E) 0.01-7 parts by mass of a water-repelling agent.

8 Claims, 1 Drawing Sheet

(51) Int. Cl.
| | |
|---|---|
| B05D 3/14 | (2006.01) |
| C09D 7/40 | (2018.01) |
| B32B 27/00 | (2006.01) |
| B32B 27/16 | (2006.01) |
| C09J 133/26 | (2006.01) |
| C09D 4/00 | (2006.01) |
| C09J 7/38 | (2018.01) |
| B32B 27/20 | (2006.01) |
| B32B 7/12 | (2006.01) |
| B32B 27/08 | (2006.01) |
| B32B 27/28 | (2006.01) |
| C09J 7/20 | (2018.01) |
| C09J 7/21 | (2018.01) |
| B32B 7/04 | (2019.01) |
| C09J 7/28 | (2018.01) |
| C09J 7/25 | (2018.01) |
| C09J 7/26 | (2018.01) |
| B32B 27/32 | (2006.01) |
| B32B 27/36 | (2006.01) |
| B32B 27/30 | (2006.01) |
| C09J 7/22 | (2018.01) |

(52) U.S. Cl.
CPC .............. *B32B 27/08* (2013.01); *B32B 27/16* (2013.01); *B32B 27/20* (2013.01); *B32B 27/281* (2013.01); *B32B 27/308* (2013.01); *B32B 27/32* (2013.01); *B32B 27/36* (2013.01); *B32B 27/365* (2013.01); *C09D 4/00* (2013.01); *C09J 7/201* (2018.01); *C09J 7/203* (2018.01); *C09J 7/21* (2018.01); *C09J 7/22* (2018.01); *C09J 7/25* (2018.01); *C09J 7/26* (2018.01); *C09J 7/28* (2018.01); *C09J 7/38* (2018.01); *C09J 7/385* (2018.01); *C09J 133/26* (2013.01); *B32B 2250/02* (2013.01); *B32B 2250/03* (2013.01); *B32B 2250/24* (2013.01); *B32B 2255/10* (2013.01); *B32B 2255/24* (2013.01); *B32B 2255/26* (2013.01); *B32B 2255/28* (2013.01); *B32B 2270/00* (2013.01); *B32B 2307/21* (2013.01); *B32B 2307/306* (2013.01); *B32B 2307/402* (2013.01); *B32B 2307/412* (2013.01); *B32B 2307/518* (2013.01); *B32B 2307/536* (2013.01); *B32B 2307/546* (2013.01); *B32B 2307/554* (2013.01); *B32B 2307/712* (2013.01); *B32B 2307/728* (2013.01); *B32B 2307/732* (2013.01); *B32B 2307/734* (2013.01); *B32B 2457/20* (2013.01); *B32B 2457/208* (2013.01); *C09J 2201/622* (2013.01); *C09J 2203/318* (2013.01); *C09J 2479/086* (2013.01); *C09J 2483/00* (2013.01)

(56) References Cited

U.S. PATENT DOCUMENTS

| | | | |
|---|---|---|---|
| 5,126,428 A | 6/1992 | Freitag et al. | |
| 5,227,458 A | 7/1993 | Freitag et al. | |
| 5,565,501 A | 10/1996 | Hosokawa et al. | |
| 7,439,279 B2* | 10/2008 | Kondo | C09D 4/00 252/8.61 |
| 8,598,280 B2 | 12/2013 | Khrenov et al. | |
| 9,149,962 B2 | 10/2015 | Saito et al. | |
| 2006/0070551 A1 | 4/2006 | Kanamori et al. | |
| 2010/0147191 A1 | 6/2010 | Sakano et al. | |
| 2011/0015317 A1* | 1/2011 | Khrenov | C08K 5/5313 524/135 |
| 2011/0165361 A1 | 7/2011 | Sherman et al. | |
| 2013/0224462 A1 | 8/2013 | Van Der Mee et al. | |
| 2014/0092041 A1 | 4/2014 | Ih | |
| 2014/0106148 A1 | 4/2014 | Kanzler et al. | |
| 2014/0248478 A1* | 9/2014 | Saito | B29C 45/14811 428/215 |
| 2016/0159995 A1 | 6/2016 | Nakashima et al. | |

FOREIGN PATENT DOCUMENTS

| | | | |
|---|---|---|---|
| JP | H0314880 A | 1/1991 | |
| JP | H03005761 A | 1/1991 | |
| JP | H0671826 A | 3/1993 | |
| JP | H06107951 A | 4/1994 | |
| JP | H08224823 A | 9/1996 | |
| JP | H11255923 A | 9/1999 | |
| JP | 200086783 A | 3/2000 | |
| JP | 20033291274 A | 10/2003 | |
| JP | 2004122429 A | 4/2004 | |
| JP | 2004346228 A | 12/2004 | |
| JP | 2005112900 A | 4/2005 | |
| JP | 2005126453 A | 5/2005 | |
| JP | 2005179613 A | 7/2005 | |
| JP | 2005307158 A | 11/2005 | |
| JP | 2006337492 A | 12/2006 | |
| JP | 2008095064 A | 4/2008 | |
| JP | 2008138084 A | 6/2008 | |
| JP | 2009161744 A | 7/2009 | |
| JP | 2009279806 A | 12/2009 | |
| JP | 2010031162 A | 2/2010 | |
| JP | 2010-138112 A | 6/2010 | |
| JP | 2010275385 A | 12/2010 | |
| JP | 2010284840 A | 12/2010 | |
| JP | 2011131407 A | 7/2011 | |
| JP | 2012048185 A | 3/2012 | |
| JP | 2012133314 A | 7/2012 | |
| JP | 2013208896 A | 10/2013 | |
| JP | 5339775 B2 | 11/2013 | |
| JP | 2014040017 A | 3/2014 | |
| JP | 2014043101 A | 3/2014 | |
| JP | 2014149520 A | 8/2014 | |
| JP | 2016-020087 A | 2/2016 | |
| KR | 920004191 B1 | 5/1992 | |
| WO | 2013061428 A1 | 5/2013 | |
| WO | WO-2013061428 A1 * | 5/2013 | ....... B29C 45/14811 |
| WO | 2015005049 A1 | 1/2015 | |
| WO | 2015040931 A1 | 3/2015 | |

OTHER PUBLICATIONS

Machine translation 2009-279806 (Year: 2009).*
JP2014-259555 Office Action dated Jul. 10, 2018; 10 pgs.
JP2015-062019 Office Action dated Apr. 25, 2017, 9 pgs.
PCT/JP2015/075797 International Search Report dated Dec. 15, 2015; 2 pgs.
PCT/JP2015/060820 International Search Report dated Jul. 7, 2015; 2 pgs.
KR10-2016-7033592 Office Action dated Nov. 1, 2017; 34 pgs.
EP15800072.9 Search Report dated Nov. 24, 2017; 8 pgs.
TW104138495 Office Action dated Apr. 11, 2019; 9 pgs.
JP2015-231213 Office Action dated Nov. 1, 2019, 9 pgs.
JP2015-200675 Office Action dated Jul. 24, 2019, 6 pgs.
CN201580065958.1 Office Action dated Nov. 29, 2019, 16 pgs.

* cited by examiner

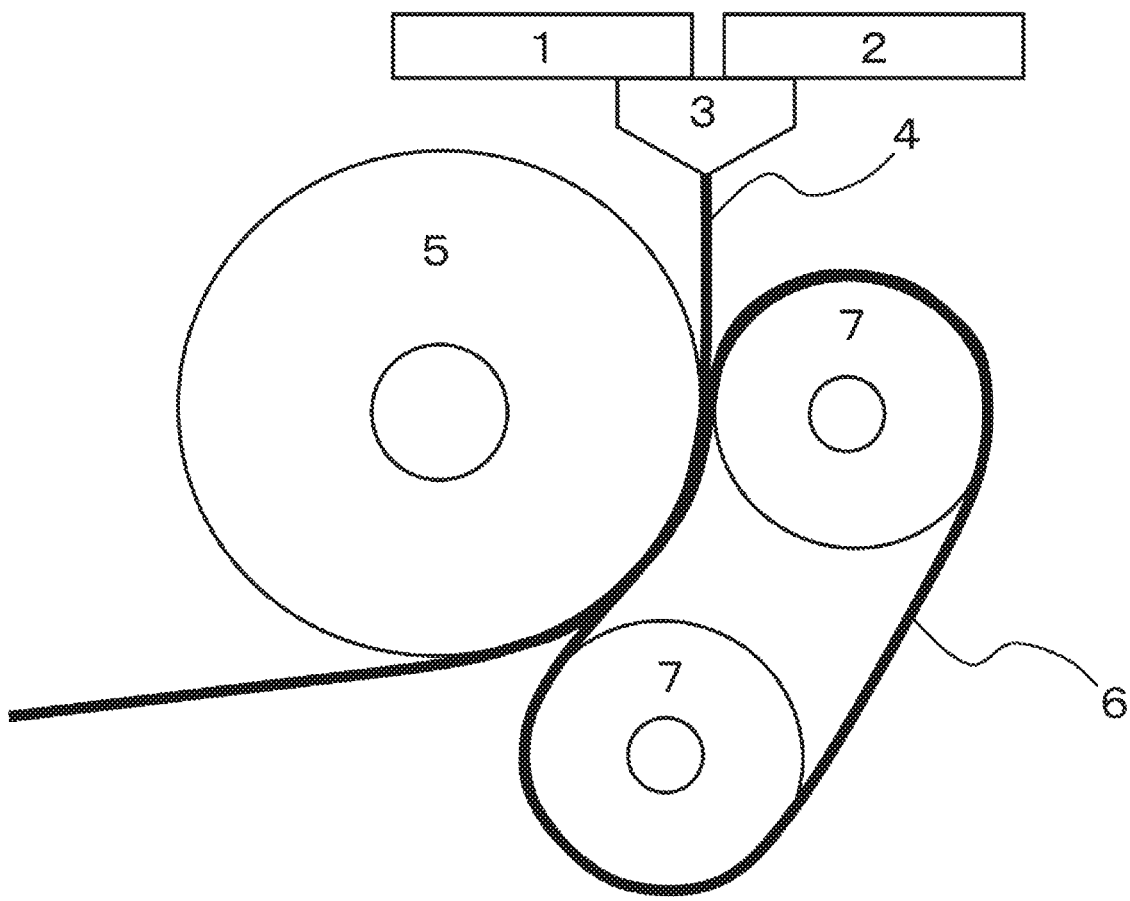

PRESSURE-SENSITIVE ADHESIVE FILM

CROSS REFERENCE TO RELATED APPLICATIONS

This application claims the benefit of and priority to PCT/JP2015/075797, filed on Sep. 11, 2015, entitled (translation), "PRESSURE-SENSITIVE ADHESIVE FILM," which claims the benefit of and priority to Japanese Patent Application No. 2014-203582, filed on Oct. 2, 2014, each of which is hereby incorporated by reference in their entirety into this application.

BACKGROUND

Field

Embodiments relate to a pressure-sensitive adhesive film. More particularly, embodiments relate to a pressure-sensitive adhesive film excellent in transparency, color tone and surface appearance, and preferably excellent in abrasion resistance, surface hardness and bending resistance.

In recent years, there have spread touch panels which are installed on image display apparatuses such as liquid crystal displays, plasma displays and electroluminescence displays and on which inputting can be carried out by touch with a finger, a pen or the like with the display being looked at. For display face plates of image display apparatuses (including image display apparatuses having a touch panel function and image display apparatuses having no touch panel function), articles using glass as their base materials are used because glass meets required properties such as heat resistance, dimensional stability, high transparency, high surface hardness and high rigidity. On the other hand, glass has a disadvantage of having low impact resistance and being easily broken. Then, it has been proposed that various types of films aiming at prevention of breakage and the like of glass are pasted on the surface of display face plates (for example, see JP2008-095064 A and JP 2010-275385 A). The abrasion resistance of these films, however, is insufficient.

Further, glass also has disadvantages such as being low in workability; being difficult to handle; having a high specific gravity and being heavy; and being difficult to meet requirements of face curving and flexibilizing of displays. Then, there are actively made research in materials in place of glass. As materials in place of glass, there have been proposed a large number of hard coat laminates in which a hard coat excellent in surface hardness and abrasion resistance is formed on the surface of a transparent resin film base material of triacetylcellulose, polyethylene terephthalate, polycarbonate, polymethyl methacrylate, a norbornene polymer or the like (for example, see JP 2013-208896 A). The abrasion resistance of such a hard coat, however, is still insufficient.

SUMMARY

Embodiments provide a pressure-sensitive adhesive film excellent in transparency, color tone and surface appearance, and preferably excellent in abrasion resistance, surface hardness and bending resistance.

Embodiments demonstrate that by using a poly(meth)acrylimide resin film as a film base material, a pressure-sensitive adhesive film excellent in transparency, color tone and surface appearance, and preferably excellent in abrasion resistance, surface hardness and bending resistance can be achieved.

According to at least one embodiment, there is provided a pressure-sensitive adhesive film, having ($\alpha$) a poly(meth)acrylimide resin film layer and ($\gamma$) a pressure-sensitive adhesive layer in order from the surface layer side, wherein the pressure-sensitive adhesive film has a total light transmittance of 80% or higher.

According to at least one embodiment, the pressure-sensitive adhesive film further has ($\delta$) a hard coat layer on the surface layer side of the ($\alpha$) poly(meth(acrylimide resin film layer.

According to at least one embodiment, the ($\delta$) hard coat layer includes an active energy ray-curable resin composition including: 100 parts by mass of (A) a polyfunctional (meth)acrylate; 0.2 to 4 parts by mass of (B) a compound having an alkoxysilyl group and a (meth)acryloyl group; 0.05 to 3 parts by mass of (C) an organotitanium; and 5 to 100 parts by mass of (D) microparticles having an average particle diameter of 1 to 300 nm.

According to at least one embodiment, the active energy ray-curable resin composition further includes 0.01 to 7 parts by mass of (E) a water repellant.

According to at least one embodiment, the (E) water repellant includes a (meth)acryloyl group-containing fluoropolyether water repellant.

According to at least one embodiment, the ($\alpha$) poly(meth)acrylimide resin film satisfies the following properties (I) and (II): (I) a total light transmittance of 85% or higher; and (II) a haze of 3.0% or lower.

According to at least one embodiment, the ($\alpha$) poly(meth)acrylimide resin film is a transparent mulitilayer film having: a first poly(meth)acrylimide resin layer ($\alpha$1) an aromatic polycarbonate resin layer ($\beta$); and a second poly(meth)acrylimide resin layer ($\alpha$2), directly laminated in this order.

According to at least one embodiment, the ($\gamma$) pressure-sensitive adhesive layer includes a silicone pressure-sensitive adhesive.

According to another embodiment, there is provided a use Use of the pressure-sensitive adhesive film, as described above, as an image display apparatus member.

According to another embodiment, there is provided animage display apparatus member, including the pressure-sensitive adhesive film, as described above.

BRIEF DESCRIPTION OF DRAWINGS

FIG. 1 is a conceptual view of an apparatus used for film formation of a transparent multilayer film ($\alpha$-1) in Example 1.

DETAILED DESCRIPTION

The pressure-sensitive adhesive film according to various embodiments has ($\alpha$) a poly(meth)acrylimide resin film layer and ($\gamma$) a pressure-sensitive adhesive layer in order from the surface layer side.

The "surface layer side" referred to herein means a side, of an article formed of a pressure-sensitive adhesive film having a multilayer structure, nearer to the outer face (a visible face in the case of a display face plate or its protection film) when the article is placed in on-site use. Further in the present description, disposing one certain layer on the "surface layer side" of another layer includes both of that these layers contact directly with each other and that another single layer or a plurality of other layers are interposed therebetween.

The (α) poly(meth)acrylimide Resin Film Layer

According to at least one embodiment, the (α) poly(meth)acrylimide resin film layer is a layer composed of a poly(meth)acrylimide resin film. By using the poly(meth)acrylimide resin film layer, the pressure-sensitive adhesive film according to various embodiments becomes one excellent in transparency, color tone, abrasion resistance, surface hardness, bending resistance and surface appearance.

According to at least one embodiment, the poly(meth)acrylimide resin is a thermoplastic resin having features as they are of high transparency, high surface hardness and high rigidity of acrylic resins, having introduced features of being excellent in thermal resistance and dimensional stability of polyimide resins, and being improved in a drawback of coloration from light yellow to reddish brown. The poly(meth)acrylimide resin is disclosed, for example, in JP 2011-519999 A. The term poly(meth)acrylimide referred to herein means polyacrylimide or polymethacrylimide.

According to at least one embodiment, the poly(meth)acrylimide resin is not limited as long as having high transparency and exhibiting no coloration for the purpose of using the pressure-sensitive adhesive film for optical articles such as touch panels, and any types of poly(meth)acrylimide resins can be used.

Preferable poly(meth)acrylimide resins include ones having a yellowness index (measured using a colorimeter "SolidSpec-3700" (trade name), available from Shimadzu Corp. according to JIS K7105:1981) of 3 or lower. The yellowness index of the poly(meth)acrylimide resin is more preferably 2 or lower, and still more preferably 1 or lower.

Further from the viewpoint of the extrusion load, and the stability of the melted film, preferable poly(meth)acrylimide resins include ones having a melt mass flow rate (measured under the condition of 260° C. and 98.07 N according to ISO 1133) of 0.1 to 20 g/10 min. The melt mass flow rate of the poly(meth)acrylimide resin is more preferably 0.5 to 10 g/10 min.

Further, the glass transition temperature of the poly(meth)acrylimide resin is preferably 150° C. or higher from the viewpoint of the thermal resistance. The glass transition temperature is more preferably 170° C. or higher.

According to at least one embodiment, the poly(meth)acrylimide resin can further contain, as required, thermoplastic resins other than the poly(meth)acrylimide resin; pigments, inorganic fillers, organic fillers, and resin fillers; and additives such as lubricants, antioxidants, weather resistance stabilizers, thermal stabilizers, mold release agents, antistatic agents and surfactants, within limits not contradictory to the objects of the various embodiments. The blend amount of each of these optional components is usually about 0.01 to 10 parts by mass based on 100 parts by mass of the poly(meth)acrylimide resin.

Commercially available examples of the poly(meth)acrylimide resin include "PLEXIMID TT70" (trade name), available from Evonik Degussa GmbH.

According to at least one embodiment, the poly(meth)acrylimide resin film is preferably a transparent multilayer film in which a first poly(meth)acrylimide resin layer (α1); an aromatic polycarbonate resin layer (β); and a second poly(meth)acrylimide resin layer (α2) are directly laminated in this order. The various embodiments will be described below on condition that the α1 layer is disposed on the surface layer side.

According to at least one embodiment, the poly(meth)acrylimide resin, though being excellent in surface hardness, does not have high punching processability. By contrast, the aromatic polycarbonate resin, though being excellent in punching processability, does not have a high surface hardness. Hence, by making the above layer structure, a transparent multilayer film can be made which puts these advantages together and is excellent in both the surface hardness and the punching processability.

According to at least one embodiment, the layer thickness of the α1 layer is not especially limited, but may be, from the viewpoint of heat resistance and surface hardness of the pressure-sensitive adhesive film according to various embodiments, usually 10 μm or larger, preferably 20 μm or larger, more preferably 40 μm or larger, and still more preferably 60 μm or larger.

According to at least one embodiment, the layer thickness of the α2 layer is not especially limited, but is, from the viewpoint of curling resistance of the pressure-sensitive adhesive film according to various embodiments, preferably the same thickness as in the α1 layer.

"The same layer thickness" referred to herein should not be interpreted to be the same layer thickness in the physicochemically strict sense of the word. Layer thicknesses in the variation ranges in the process and quality control usually industrially carried out should be interpreted to be the same layer thickness. This is because when the layer thicknesses are the same layer thickness in the variation ranges in the process and quality control usually industrially carried out, the curling resistance of the multilayer film can be held good. In the case of a non-stretched multilayer film by a T-die coextrusion method, since the process and quality control is carried out usually so that the layer thickness is in a variation width of about −5 to +5 μm, a layer thickness 65 μm and a layer thickness 75 μm should be interpreted to be the same. "The same layer thickness" herein can also be expressed as "substantially the same layer thickness" in other words.

According to at least one embodiment, the layer thickness of the β layer is not especially limited, but may be, from the viewpoint of cutting processability of the pressure-sensitive adhesive film according to various embodiments, usually 20 μm or larger, preferably 40 μm or larger, and more preferably 60 μm or larger.

A poly(meth)acrylimide resin to be used for two layers of the α1 layer and the α2 layer was described in the above.

Here, as a poly(meth)acrylimide resin for the α1 layer and a poly(meth)acrylimide resin for the α2 layer, there may be used poly(meth)acrylimide resins having different resin properties, for example, different melt mass flow rates and glass transition temperatures. From the viewpoint of the curling resistance of the transparent multilayer film, however, there are preferably used poly(meth)acrylimide resins having the same resin properties. For example, use of the same grade and the same lot is one embodiment.

As the aromatic polycarbonate resin to be used for the β layer, there can be used, for example, one of or a mixture of two or more of aromatic polycarbonate resins including: polymers obtained by an interfacial polymerization method of an aromatic dihydroxy compound such as bisphenol A, dimethylbisphenol A or 1,1-bis(4-hydroxyphenyl)-3,3,5-trimethylcyclohexane with phosgene; and polymers obtained by a transesterification of an aromatic dihydroxy compound such as bisphenol A, dimethylbisphenol A or 1,1-bis(4-hydroxyphenyl)-3,3,5-trimethylcyclohexane with a carbonate diester such as diphenyl carbonate.

Preferable optional components which the aromatic polycarbonate resin can contain include core shell rubbers. With respect to 100 parts by mass of the total amount of the aromatic polycarbonate resin and the core shell rubber, use of the core shell rubber in an amount of 0 to 30 parts by mass (100 to 70 parts by mass of the aromatic polycarbonate resin), preferably 0 to 10 parts by mass (100 to 90 parts by mass of the aromatic polycarbonate resin), can further enhance the cutting processability and the impact resistance.

Examples of the core shell rubber include core shell rubbers such as methacrylate ester-styrene/butadiene rubber graft copolymers, acrylonitrile-styrene/butadiene rubber graft copolymers, acrylonitrile-styrene/ethylene-propylene rubber graft copolymers, acrylonitrile-styrene/acrylate ester graft copolymers, methacrylate ester/acrylate ester rubber graft copolymers and methacrylate ester-acrylonitrile/acrylate ester rubber graft copolymers. These core shell rubbers can be used singly or in the form of a mixture of two or more.

The aromatic polycarbonate resin can further contain, as required, thermoplastic resins other than the aromatic polycarbonate resin and the core shell rubber; pigments, inorganic fillers, organic fillers, and resin fillers; and additives such as lubricants, antioxidants, weather resistance stabilizers, thermal stabilizers, mold release agents, antistatic agents and surfactants, within limits not contradictory to the objects of the various embodiments. The blend amount of these optional components is usually about 0.01 to 10 parts by mass to 100 parts by mass of the total amount of the aromatic polycarbonate resin and the core shell rubber.

A method for producing the poly(meth)acrylimide resin film is not especially limited, but includes, for example, a method comprising (A) a step of continuously extruding a melted film of a poly(meth)acrylimide resin from a T die by using an apparatus equipped with an extruder and the T die, and (B) a step of feeding and charging and pressing the melted film of the poly(meth)acrylimide resin between a rotating or circulating first mirror-finished body and a rotating or circulating second mirror-finished body.

Similarly, a production method of a transparent multilayer film in the case where the poly(meth)acrylimide resin film is the transparent multilayer film having the α1 layer, the β layer and the α2 layer directly laminated in this order is not especially limited, but includes, for example, a method comprising (A') a step of continuously coextruding from a T die a melted film of the transparent multilayer film having the first poly(meth)acrylimide resin layer (α1), the aromatic polycarbonate resin layer (β) and the second poly(meth)acrylimide resin layer (α2) directly laminated in this order by using a coextrusion apparatus equipped with an extruder and the T die and; and (B') a step of feeding and charging and pressing the melted film of the transparent multilayer film between a rotating or circulating first mirror-finished body and a rotating or circulating second mirror-finished body.

As the T die to be used in the step (A) or the step (A), any one can be used. Examples of the T die include manifold dies, fish tail dies and coat hanger dies.

As the coextrusion apparatus, any ones can be used. Examples of the coextrusion apparatus include ones of feed block type, multi-manifold type and stack plate type.

As the extruder to be used in the step (A) or the step (A'), any one can be used. Examples of the extruder include single-screw extruders, co-rotating twin-screw extruders and counter-rotating twin-screw extruders.

Further in order to suppress the degradation of the poly (meth)acrylimide resin and the aromatic polycarbonate resin, nitrogen purging in the extruder is also preferable.

Further the poly(meth)acrylimide resin is, since being a resin high in hygroscopicity, preferably dried before being supplied to film formation. Further conveying and charging the poly(meth)acrylimide resin dried in a drier directly from the drier to the extruder is also preferable. The set temperature of the drier is preferably 100 to 150° C. Further, installing a vacuum vent on the extruder (usually on a measuring zone at a screw tip) is also preferable.

The temperature of the T die to be used in the step (A) or the step (A') is, in order to stably carrying out the step of continuously extruding or coextruding the melted film of the poly(meth)acrylimide resin or the melted film of the transparent multilayer film, preferably set at 260° C. or higher at lowest. The temperature is more preferably 270° C. or higher. Further in order to suppress the degradation of the poly(meth)acrylimide resin and the aromatic polycarbonate resin, the temperature of the T die is preferably set at 350° C. or lower.

Further the ratio (R/T) of the lip opening (R) to the thickness (T) of an obtained poly(meth)acrylimide film is, from the viewpoint of making the retardation not to become large, usually 10 or lower, preferably 5 or lower, and more preferably 2.5 or lower. Further the ratio (R/T) is, from the viewpoint of making the extrusion load not to become too high, preferably 1 or higher, more preferably 1.1 or higher, and still more preferably 1.5 or higher.

Examples of the first mirror-finished body to be used in the step (B) or the step (B') include mirror-finished rolls and mirror-finished belts. Examples of the second mirror-finished body include mirror-finished rolls and mirror-finished belts.

According to at least one embodiment, the mirror-finished roll is a roll having a mirror-finished surface. The material of the mirror-finished roll includes metals, ceramics and silicon rubbers. The surface of the mirror-finished roll, for the purpose of protecting it from being corroded and scratched, can be subjected to a chromium plating, an iron-phosphorus alloy plating, a hard carbon treatment using a PVD method or a CVD method, or the like.

According to at least one embodiment, the mirror-finished belt is a seamless belt whose surface has been mirror-finished and which is usually of a metal. It is made, for example, to be encirclingly mounted on and circulated between a pair of belt rollers. Further the surface of the mirror-finished belt, for the purpose of protecting it from being corroded and scratched, can be subjected to a chromium plating, an iron-phosphorus alloy plating, a hard carbon treatment using a PVD method or a CVD method, or the like.

According to at least one embodiment, the mirror finishing is not limited, and can be carried out by an optional method. Examples thereof include a method in which by polishing the surface with fine abrasive grains, the arithmetic average roughness (Ra) of the surface of the mirror-finished body is made preferably 100 nm or lower, more preferably 50 nm or lower, and the ten-point average roughness (Rz) thereof is made preferably 500 nm or lower, more preferably 250 nm or lower.

According to at least one embodiment, the reason that the poly(meth)acrylimide resin film or the transparent multilayer film excellent in transparency, surface smoothness and appearance is obtained by the above film formation method is, though there is no intention of being bound to any theory, considered to be because by pressing the melted film of the poly(meth)acrylimide resin film or the transparent multilayer film between the first mirror-finished body and the second mirror-finished body, the highly smooth surface state of the first mirror-finished body and the second mirror-finished body is transferred to the film and defective portions such as die streaks are corrected.

In order for the transfer of the above surface state to be well carried out, the surface temperature of the first mirror-finished body is usually 70° C. or higher, and preferably made 100° C. or higher. It is more preferably 120° C. or higher, and still more preferably 130° C. or higher. By contrast, in order to prevent the development on the film of appearance defects (exfoliation marks) accompanying the peeling-off from the first mirror-finished body, the surface temperature of the first mirror-finished body is preferably 200° C. or lower, and more preferably 160° C. or lower.

In order for the transfer of the above surface state to be well carried out, the surface temperature of the second mirror-finished body is usually 10° C. or higher, and preferably made to be 20° C. or higher. The surface temperature is more preferably 60° C. or higher, and still more preferably 100° C. or higher. By contrast, in order to prevent the development on the film of appearance defects (exfoliation marks) accompanying the peeling-off from the second mirror-finished body, the surface temperature of the second mirror-finished body is preferably 200° C. or lower, and more preferably 160° C. or lower.

Here, it is preferable that the surface temperature of the first mirror-finished body be made higher than the surface temperature of the second mirror-finished body. This is to make the film to be held on the first mirror-finished body and to be delivered to a following transfer roll.

According to at least one embodiment, the thickness of the poly(meth)acrylimide resin film (including the transparent multilayer film; hereinafter the same is applied) is not especially limited, and can be an optional thickness as desired. In the case where the pressure-sensitive adhesive film according to various embodiments is used as a display face plate, from the viewpoint of holding the rigidity, the thickness of the poly(meth)acrylimide resin film may be usually 100 μm or larger, preferably 200 μm or larger, and more preferably 300 μm or larger. Further from the viewpoint of meeting the requirement of the thickness reduction of image display apparatuses, the thickness of the poly(meth)acrylimide resin film may be usually 1,500 μm or smaller, preferably 1,200 μm or smaller, and more preferably 1,000 μm or smaller. In the case where the pressure-sensitive adhesive film according to various embodiments is used as a protection film for the surface of a display face plate, from the viewpoint of the handleability, the thickness of the poly(meth)acrylimide resin film may be usually 20 μm or larger, and preferably 50 μm or larger. Further from the viewpoint of the economic efficiency, the thickness of the poly(meth)acrylimide resin film may be usually 250 μm or smaller, and preferably 150 μm or smaller.

According to at least one embodiment, the total light transmittance (as measured according to JIS K7361-1:1997 by using a turbidimeter "NDH2000" (trade name) of Nippon Denshoku Industries Co., Ltd.) of the poly(meth)acrylimide resin film is preferably 85% or higher, more preferably 88% or higher, still more preferably 90% or higher, and most preferably 92% or higher. A higher total light transmittance of the poly(meth)acrylimide resin film is preferable. When the poly(meth)acrylimide resin film has such a high total light transmittance, there can be provided the pressure-sensitive adhesive film suitably usable as an image display apparatus member.

The haze (as measured according to JIS K7136:2000 by using a turbidimeter "NDH2000" (trade name) of Nippon Denshoku Industries Co., Ltd.) of the poly(meth)acrylimide resin film is preferably 3.0% or lower, more preferably 2.1% or lower, still more preferably 2.0% or lower, and most preferably 1.5% or lower. A lower haze of the poly(meth)acrylimide resin film is preferable. When the poly(meth)acrylimide resin film has such a low haze, there can be provided the pressure-sensitive adhesive film suitably usable as an image display apparatus member.

According to at least one embodiment, the yellowness index (as measured according to JIS K7105:1981 by using a chromaticity meter "SolidSpec-3700" (trade name) of Shimadzu Corp.) of the poly(meth)acrylimide resin film is preferably 3 or lower, more preferably 2 or lower, and still more preferably 1 or lower. A lower yellowness index of the poly(meth)acrylimide resin film is preferable. When the poly(meth)acrylimide resin film has such a low yellowness index, there can be provided the pressure-sensitive adhesive film suitably usable as an image display apparatus member.

In the poly(meth)acrylimide resin film, when the (γ) pressure-sensitive adhesive layer and the (δ) hard coat layer are formed, in order to enhance the adhesive strength, an easy-adhesion treatment such as a corona discharge treatment or an anchor coat formation may be carried out in advance on at least one surface of the poly(meth)acrylimide resin film.

In the case where the corona discharge treatment is carried out, by making the wetting index (measured according to JIS K6768:1999) to be usually 50 mN/m or higher, preferably 60 mN/m or higher, a good interlayer adhesive strength can be obtained. After the corona discharge treatment is carried out, an anchor coat may further be formed.

According to at least one embodiment, the corona discharge treatment involves passing the film between an insulated electrode and a dielectric roll, and applying a high-frequency high-voltage therebetween to generate a corona discharge thereby treating the film surface. The corona discharge ionizes oxygen and the like; the ions collide against the film surface and cause the scission of resin molecule chains and the addition of oxygen-containing functional groups to resin molecule chains on the film surface thereby raising the wetting index.

According to at least one embodiment, the treatment amount (S) per unit area and unit time of the corona discharge treatment is determined from the viewpoint of providing the above wetting index, and is usually 80 W·min/m² or larger, and more preferably 120 W·min/m² or larger. Further from the viewpoint of preventing the degradation of the film, the treatment amount (S) is preferably suppressed to 500 W·min/m² or smaller, more preferably 400 W·min/m² or smaller.

Here, the treatment amount (S) is defined by the following expression.

$$S=P/(L·V)$$

wherein,
S: a treatment amount (W·min/m²);
P: a discharge power (W);
L: a length of the discharge electrode (m); and
V: a line velocity (m/min)

An anchor coat agent for forming the anchor coat is not especially limited as long as having high transparency and exhibiting no coloration. As the anchor coat agent, there can be used, for example, a known one such as polyester, acrylate, polyurethane, acrylic urethane or polyester urethane. Among these, from the viewpoint of improving the adhesive strength with the (γ) pressure-sensitive adhesive layer and the (δ) hard coat layer, a thermoplastic urethane anchor coat agent is preferable.

Further as the anchor coat agent, there may be used a coating material containing a silane coupling agent. The silane coupling agent is a silane compound having at least two different reactive groups of a hydrolyzable group (for example, an alkoxy group such as a methoxy group or an ethoxy group, an acyloxy group such as an acetoxy group, and a halogen group such as a chloro group), and an organic functional group (for example, an amino group, a vinyl group, an epoxy group, a methacryloxy group, an acryloxy group and an isocyanate group). Such a silane coupling agent serves to improve the adhesive strength with the (γ) pressure-sensitive adhesive layer and the (δ) hard coat layer. Among these, from the viewpoint of improving the adhesive strength, a silane coupling agent having an amino group is preferable.

A coating material containing the silane coupling agent may be one containing the silane coupling agent as a measure component (i.e. in an amount of 50% by mass or more as the solid content). Preferably, 75% by mass or more of the solid content of the coating material is the silane coupling agent, and more preferably, 90% by mass or more is the silane coupling agent.

Examples of the silane coupling agent having an amino group include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, and N-(vinylbenzyl)-2-aminoethyl-3-aminopropyltrimethoxysilane. The silane coupling agent having the amino group can be used singly or as a mixture of two or more thereof.

A method for forming an anchor coat by using the anchor coat agent is not limited, and a known method can be used. The method specifically includes roll coating, gravure coating, reverse coating, roll brushing, spray coating, air knife coating and die coating. At this time, as required, there can be used an optional dilution solvent, for example, methanol, ethanol, 1-methoxy-2-propanol, n-butyl acetate, toluene, methyl ethyl ketone, methyl isobutyl ketone, ethyl acetate or acetone.

According to at least one embodiment, the anchor coat agent may further contain one or two or more additives such as antioxidants, weather resistance stabilizers, light resistance stabilizers, ultraviolet absorbents, thermal stabilizers, antistatic agents, surfactants, colorants, infrared shielding agents, leveling agents, thixotropy imparting agents and fillers, within limits not contradictory to the objects of the various embodiments.

According to at least one embodiment, the thickness of the anchor coat is usually about 0.01 to 5 μm, and preferably 0.1 to 2 μm.

The (γ) Pressure-Sensitive Adhesive Layer

According to at least one embodiment, the (γ) pressure-sensitive adhesive layer is a layer comprising a composition comprising a pressure-sensitive adhesive (hereinafter, sometimes referred to simply as "pressure-sensitive adhesive").

The (γ) pressure-sensitive adhesive layer may be formed on both sides of the (α) poly(meth)acrylimide resin film layer. That is, the pressure-sensitive adhesive film according to various embodiments may be one having (γ) a second pressure-sensitive adhesive layer, (α) a poly(meth)acrylimide resin film layer and (γ) a first pressure-sensitive adhesive layer in order from the surface layer side. The pressure-sensitive adhesive film may further have (α) a poly(meth)acrylimide resin film layer on the (γ) second pressure-sensitive adhesive layer. That is, the pressure-sensitive adhesive film according to various embodiments may be one having (α) a second poly(meth)acrylimide resin film layer, (γ) a second pressure-sensitive adhesive layer, (α) a first poly(meth)acrylimide resin film layer and (γ) a first pressure-sensitive adhesive layer in order from the surface layer side. The first pressure-sensitive adhesive layer and the second pressure-sensitive adhesive layer may be identical or different, but are more preferably identical. The first poly(meth)acrylimide resin film layer and the second poly(meth)acrylimide resin film layer may be identical or different, but are more preferably identical.

According to at least one embodiment, the pressure-sensitive adhesive to form the (γ) pressure-sensitive adhesive layer is not limited as long as being excellent in transparency for the purpose of using the pressure-sensitive adhesive film according to various embodiments as an image display apparatus member. The pressure-sensitive adhesive is preferably excellent in transparency and non-coloration. As the pressure-sensitive adhesive, there can be used known acrylic, urethane, rubber, and silicone pressure-sensitive adhesives.

In the present description, the "pressure-sensitive adhesive excellent in transparency" means a pressure-sensitive adhesive having a visible light transmittance of 80% or higher, preferably 85% or higher, and more preferably 90% or higher. Here, the visible light transmittance is a value calculated as a proportion of an integrated area of a transmission spectrum at wavelengths of 380 to 780 nm of a pressure-sensitive adhesive as measured by using a spectrophotometer "SolidSpec-3700" (trade name) of Shimadzu Corp. and a quartz cell of 10 mm in optical path distance to an integrated area of a transmission spectrum in the case where the transmittance in the entire region at wavelengths of 380 to 780 nm is assumed to be 100%.

In the present description, the "pressure-sensitive adhesive excellent in non-coloration" means a pressure-sensitive adhesive having a yellowness index of 3 or lower, preferably 2 or lower, and more preferably 1 or lower. Here, the yellowness index is a value measured according to JIS K7105:1981 by using a chromaticity meter "SolidSpec-3700" (trade name) of Shimadzu Corp. and a quartz cell of 10 mm in optical path distance.

In the case of using the pressure-sensitive adhesive film according to various embodiments as a display face plate, from the viewpoint of light resistance and heat resistance, the pressure-sensitive adhesive is preferably an acrylic pressure-sensitive adhesive. The acrylic pressure-sensitive adhesive is a pressure-sensitive adhesive composition comprising an acrylic polymer and optional components to be used as desired.

Examples of the acrylic polymer include polymers or copolymers obtained by using as monomers one of or a mixture of two or more of (meth)acrylate ester monomers such as methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth)acrylate, palmityl (meth)acrylate and stearyl (meth)acrylate; carboxyl group-containing monomers such as acrylic acid, methacrylic acid, itaconic acid and β-carboxyethyl (meth)acrylate; epoxy group-containing monomers such as glycidyl (meth)acrylate and 4-hydroxybutyl (meth)acrylate glycidyl ether; and hydroxyl group-containing (meth)acrylate ester monomers such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate and 4-hydroxybutyl (meth)acrylate. Here, (meth)acrylic acid means acrylic acid or methacrylic acid. A (meth)acrylate means an acrylate or a methacrylate. These acrylic polymers can be used singly or in the form of a mixture of two or more.

Examples of the optional components usable for the acrylic pressure-sensitive adhesive include silane coupling agents, compounds having two or more epoxy groups in one molecule, compounds having two or more isocyanate groups in one molecule, photopolymerization initiators, organic polyvalent metal compounds, antistatics, surfactants, leveling agents, thixotropy imparting agents, anti-fouling agents, printability improvers, antioxidants, weather resistance stabilizers, light resistance stabilizers, ultraviolet absorbents, thermal stabilizers, pigments and fillers. The blend amount of the optional components may be about 0.01 to 10 parts by mass to 100 parts by mass of the acrylic polymer.

In the case of using the pressure-sensitive adhesive film according to various embodiments as a pressure-sensitive adhesive film to protect the surface of a display face plate, from the viewpoint that the pressure-sensitive adhesive film can be pasted to the surface even by hand without entraining bubbles and causing appearance defects such as bulges (hereinafter, referred to as "air bleedability"); the pasted pressure-sensitive adhesive film does not slip and peel in long-term use in the environment including temperature changes even without being imparted an external force (hereinafter, referred to as "heat cycle reliability"); and in renewal of the pasted pressure-sensitive adhesive film, the pressure-sensitive adhesive film can be peeled by hand without leaving any adhesive residue and without causing any change in the appearance thereof (hereinafter, referred to as "appearance sustainability at peeling"), a silicone pressure-sensitive adhesive is preferable.

According to at least one embodiment, the silicone pressure-sensitive adhesive is not especially limited, but there can be used, for example, either of addition reaction-type silicone pressure-sensitive adhesives and peroxide curing-type silicone pressure-sensitive adhesives. The addition reaction-type silicone pressure-sensitive adhesives are pressure-sensitive adhesive compositions comprising a silicone polymer containing an addition-reactive organic group such as a vinyl group, an addition reaction catalyst including a platinum compound such as chloroplatinic acid, a rhodium complex or a ruthenium complex, and optional components to be used as desired. The peroxide curing-type silicone pressure-sensitive adhesives are pressure-sensitive adhesive compositions comprising a silicone polymer, an organic peroxide such as benzoyl peroxide, and optional components to be used as desired.

Examples of the optional components usable for the silicone pressure-sensitive adhesive include antistatics, surfactants, leveling agents, thixotropy imparting agents, anti-fouling agents, printability improvers, antioxidants, weather resistance stabilizers, light resistance stabilizers, ultraviolet absorbents, thermal stabilizers, pigments and fillers. The blend amount of the optional components may be about 0.01 to 10 parts by mass to 100 parts by mass of the silicone polymer.

A method for forming the (γ) pressure-sensitive adhesive layer on at least one surface of the poly(meth)acrylimide resin film by using the pressure-sensitive adhesive is not especially limited, and any web applying method can be used. Examples of the web applying method include roll coating, gravure coating, reverse coating, roll brushing, spray coating, air knife coating and die coating. Further when the layer (γ) is formed, there can be used a known diluting solvent, for example, methyl ethyl ketone, methyl isobutyl ketone, ethyl acetate, n-butyl acetate, isopropanol, 1-methoxy-2-propanol, methanol, ethanol, toluene, xylene or acetone.

According to at least one embodiment, the thickness of the (γ) pressure-sensitive adhesive layer is not especially limited, but in consideration of using the known web applying method, usually 0.5 to 200 μm, preferably 1 to 120 μm, and more preferably 5 to 50 μm.

The (δ) Hard Coat Layer

According to at least one embodiment, the pressure-sensitive adhesive film preferably further has the (δ) hard coat layer on the surface layer side of the (α) poly(meth) acrylimide resin film layer. This can improve the abrasion resistance and the surface hardness.

According to at least one embodiment, the (δ) hard coat layer may be formed on both sides of the (α) poly(meth) acrylimide resin film layer. That is, the pressure-sensitive adhesive film according to various embodiments may be one having (δ) a first hard coat layer, (α) a poly(meth)acrylimide resin film layer, (δ) a second hard coat layer, and (γ) a pressure-sensitive adhesive layer in order from the surface layer side. Further the pressure-sensitive adhesive film may have a structure having, in addition to the (α) poly(meth) acrylimide resin film layer having the (δ) hard coat layer formed thereon, (α) a poly(meth)acrylimide resin film layer having (γ) a pressure-sensitive adhesive layer formed thereon. The pressure-sensitive adhesive film according to various embodiments may be one having, for example, (δ) a hard coat layer, (α) a second poly(meth)acrylimide resin film layer, (γ) a second pressure-sensitive adhesive layer, (α) a first poly(meth)acrylimide resin film layer, and (γ) a first pressure-sensitive adhesive layer in order from the surface layer side.

According to at least one embodiment, the first hard coat layer and the second hard coat layer may be identical or different, but are more preferably identical. The first pressure-sensitive adhesive layer and the second pressure-sensitive adhesive layer may be identical or different, but are more preferably identical. The first poly(meth)acrylimide resin film layer and the second poly(meth)acrylimide resin film layer may be identical or different, but are more preferably identical.

A coating material to form the (δ) hard coat layer is not limited as long as being excellent in transparency for the purpose of using the pressure-sensitive adhesive film according to various embodiments as an image display apparatus member, and an optional coating material can be used. The coating material for forming the hard coat layer is preferably excellent in transparency and non-coloration. What is meant by each of the expressions "being excellent in transparency" and "being excellent in non-coloration" referred to herein conforms to the above description regarding these properties of the pressure-sensitive adhesive. A preferable coating material for forming the hard coat layer includes active energy ray-curable resin compositions.

According to at least one embodiment, the active energy ray-curable resin compositions are ones capable of being polymerized and cured by active energy rays such as ultraviolet rays or electron beams and forming a hard coat. Examples of the active energy ray-curable resin compositions include compositions comprising an active energy ray-curable resin, and together a compound having two or more isocyanate groups (—N=C=O) in one molecule thereof and/or a photopolymerization initiator.

Examples of the active energy ray-curable resin include resins composed of one or more monomers selected from (meth)acryloyl group-containing prepolymers or oligomers such as polyurethane (meth)acrylate, polyester (meth)acrylate, polyacryl (meth)acrylate, epoxy (meth)acrylate, polyalkylene glycol poly(meth)acrylate and polyether (meth)acrylate; (meth)acryloyl group-containing monofunctional reactive monomers such as methyl (meth)acrylate, ethyl (meth)acrylate, n-butyl (meth)acrylate, hexyl (meth)acrylate, 2-ethylhexyl (meth)acrylate, lauryl (meth)acrylate, isobonyl (meth)acrylate, dicyclopentenyl (meth)acrylate, dicyclopentenyloxyethyl (meth)acrylate, phenyl (meth)acrylate, phenyl cellosolve (meth)acrylate, 2-methoxyethyl (meth)acrylate, hydroxyethyl (meth)acrylate, hydroxypropyl (meth)acrylate, 2-acryloyloxyethyl hydrogen phthalate, dimethylaminoethyl (meth)acrylate, trifluoroethyl (meth)acrylate and trimethylsiloxyethyl methacrylate; monofunctional reactive monomers such as N-vinylpyrrolidone and styrene; (meth)acryloyl group-containing bifunctional reactive monomers such as diethylene glycol di(meth)acrylate, neopentyl glycol di(meth)acrylate, 1,6-hexanediol di(meth)acrylate, polyethylene glycol di(meth)acrylate, 2,2'-bis(4-(meth)acryloyloxypolyethyleneoxyphenyl)propane and 2,2'-bis(4-(meth)acryloyloxypolypropyleneoxyphenyl)propane; (meth)acryloyl group-containing trifunctional reactive monomers such as trimethylolpropane tri(meth)acrylate and trimethylolethane tri(meth)acrylate; (meth)acryloyl group-containing tetrafunctional reactive monomers such as pentaerythritol tetra(meth)acrylate; and (meth)acryloyl group-containing hexafunctional reactive monomers such as dipentaerythritol hexaacrylate, and resins having the one or more monomers as constituting monomers. These active energy ray-curable resin compositions can be used singly or in the form of a mixture of two or more thereof.

The term (meth)acrylate referred to herein means an acrylate or a methacrylate.

Examples of the compound having two or more isocyanate groups in one molecule thereof include methylenebis-4-cyclohexyl isocyanate; polyisocyanates such as trimethylolpropane adducts of tolylene diisocyanate, trimethylolpropane adducts of hexamethylene diisocyanate, trimethylolpropane adducts of isophorone diisocyanate, isocyanurates of tolylene diisocyanate, isocyanurates of hexamethylene diisocyanate, isocyanurates of isophorone diisocyanate, and biurets of hexamethylene diisocyanate; and urethane crosslinking agents such as blocked isocyanates of the above polyisocyanates. These can be used singly or in combinations of two or more. Further when crosslinking is carried out, as required, there may be added a catalyst such as dibutyltin dilaurate or dibutyltin diethyl hexoate.

Examples of the photopolymerization initiator include benzophenone compounds such as benzophenone, methyl-o-benzoyl benzoate, 4-methylbenzophenone, 4,4'-bis(diethylamino)benzophenone, methyl o-benzoylbenzoate, 4-phenylbenzophenone, 4-benzoyl-4'-methyldiphenyl sulfide, 3,3',4,4'-tetra(tert-butylperoxycarbonyl)benzophenone and 2,4,6-trimethylbenzophenone; benzoin compounds such as benzoin, benzoin methyl ether, benzoin ethyl ether, benzoin isopropyl ether and benzyl methyl ketal; acetophenone compounds such as acetophenone, 2,2-dimethoxy-2-phenylacetophenone and 1-hydroxycyclohexyl phenyl ketone; anthraquinone compounds such as methylanthraquinone, 2-ethylanthraquinone and 2-amylanthraquinone; thioxanthone compounds such as thioxanthone, 2,4-diethylthioxanthone and 2,4-diisopropylthioxanthone; alkylphenone compounds such as acetophenone dimethyl ketal; triazine compounds; biimidazole compounds; acylphosphine oxide compounds; titanocene compounds; oxime ester compounds; oxime phenylacetate ester compounds; hydroxyketone compounds; and aminobenzoate compounds. These can be used singly or in combinations of two or more.

According to at least one embodiment, the (δ) hard coat layer preferably comprises an active energy ray-curable resin composition comprising 100 parts by mass of (A) a polyfunctional (meth)acrylate, 0.2 to 4 parts by mass of (B) a compound having an alkoxysilyl group and a (meth)acryloyl group, 0.05 to 3 parts by mass of (C) an organotitanium, and 5 to 100 parts by mass of (D) microparticles having an average particle diameter of 1 to 300 nm. The (δ) hard coat layer more preferably comprises an active energy ray-curable resin composition comprising 100 parts by mass of (A) a polyfunctional (meth)acrylate, 0.2 to 4 parts by mass of (B) a compound having an alkoxysilyl group and a (meth)acryloyl group, 0.05 to 3 parts by mass of (C) an organotitanium, 5 to 100 parts by mass of (D) microparticles having an average particle diameter of 1 to 300 nm, and 0.01 to 7 parts by mass of (E) a water repellant. When the (δ) hard coat layer has such a composition, there can be obtained the pressure-sensitive adhesive film excellent in transparency, color tone, abrasion resistance, surface hardness, bending resistance and surface appearance, and capable of maintaining surface properties such as finger slidability even if being repeatedly wiped with a handkerchief or the like.

(A) A Polyfunctional (meth)acrylate:

According to at least one embodiment, the component A is a (meth)acrylate having two or more (meth)acryloyl groups in one molecule thereof. This compound, since having two or more (meth)acryloyl groups in one molecule thereof, is polymerized and cured by active energy rays such as ultraviolet rays and electron beams thereby serving to form a hard coat.

Examples of the polyfunctional (meth)acrylate include (meth)acryloyl group-containing bifunctional reactive monomers such as diethylene glycol di(meth)acrylate, neopentyl glycol di(meth)acrylate, 1,6-hexanediol di(meth)acrylate, polyethylene glycol di(meth)acrylate, 2,2'-bis(4-(meth)acryloyloxypolyethyleneoxyphenyl)propane and 2,2'-bis(4-(meth)acryloyloxypolypropyleneoxyphenyl)propane; (meth)acryloyl group-containing trifunctional reactive monomers such as trimethylolpropane tri(meth)acrylate and trimethylolethane tri(meth)acrylate; (meth)acryloyl group-containing tetrafunctional reactive monomers such as pentaerythritol tetra(meth)acrylate; (meth)acryloyl group-containing hexafunctional reactive monomers such as dipentaerythritol hexaacrylate; and polymers (oligomers and prepolymers) composed of one or more thereof as constituent monomers. The component A can be used singly or as a mixture of two or more thereof.

The (B) Compound Having an Alkoxysilyl Group and a (Meth)Acryloyl Group

According to at least one embodiment, the component B can chemically bond with or strongly interact with the component A due to having a (meth)acryloyl group in the molecule; and with the component D due to having an alkoxysilyl group in the molecule, and serves to largely improve the abrasion resistance of a hard coat. Further the component B, due to having a (meth)acryloyl group in the molecule or due to having an alkoxysilyl group in the molecule, chemically bonds with or strongly interacts with the component E also, and also serves to prevent trouble such as bleedout of the component E. Here, a (meth)acryloyl group means an acryloyl group or a methacryloyl group.

Here, the component B is distinguished from the component A in that the component B has an alkoxysilyl group. A compound of the component A has no alkoxysilyl group. In the present description, a compound having an alkoxysilyl group and two or more (meth)acryloyl groups in one molecule thereof is a component B.

Examples of the component B include compounds having a chemical structure represented by the general formula $(—SiO_2RR'—)_n·(—SiO_2RR''—)_m$. Here, n is a natural number (positive integer), and m is 0 or a natural number. Preferably, n is a natural number of 2 to 10, and m is 0 or a natural number of 1 to 10. R is an alkoxy group such as a methoxy group ($CH_3O—$) or an ethoxy group ($C_2H_5O—$). R is an acryloyl group ($CH_2=CHCO—$) or a methacryloyl group ($CH_2=C(CH_3)CO—$). R' is an alkyl group such as a methyl group ($CH_3$) or an ethyl group ($CH_2CH_3$).

Examples of the component B include compounds having a chemical structure represented by the general formula "$(—SiO_2(OCH_3)(OCHC=CH_2)—)_n$", "$(—SiO_2(OCH_3)(OC(CH_3)C=CH_2)—)_n$", "$(—SiO_2(OCH_3)(OCHC=CH_2)—)_n·(—SiO_2(OCH_3)(CH_3)—)_m$", "$(—SiO_2(OCH_3)(OC(CH_3)C=CH_2)—)_n·(—SiO_2(OCH_3)(CH_3)—)_m$", "$(—SiO_2(OC_2H_5)(OCHC=CH_2)—)_n$", "$(—SiO_2(OC_2H_5)(OC(CH_3)C=CH_2)—)n$", "$(—SiO_2(OC_2H_5)(OCHC=CH_2)—)_n·(—SiO_2(OCH_3)(CH_3)—)_m$", or "$(—SiO_2(OC_2H_5)(OC(CH_3)C=CH_2)—)_n·(—SiO_2(OCH_3)(CH_3)—)_m$". Here, n is a natural number (positive integer), and m is 0 or a natural number. Preferably, n is a natural number of 2 to 10, and m is 0 or a natural number of 1 to 10.

According to at least one embodiment, the component B can be used singly or as a mixture of two or more thereof. According to at least one embodiment, the blend amount of the component B may be, from the viewpoint of the abrasion resistance, with respect to 100 parts by mass of the component A, 0.2 part by mass or larger, preferably 0.5 part by mass or larger, and more preferably 1 part by mass or larger. On the other hand, from the viewpoint of making the water repellency to be easily developed and from the viewpoint of making the amount of the component C not to become excessive when the blend ratio between the component B and the component C is made to be in the preferable range, the blend amount of the component B may be 4 parts by mass or smaller, preferably 3 parts by mass or smaller, and more preferably 2 parts by mass or smaller.

Further from the viewpoint of making the component B to chemically bond with or strongly interact with the component D, with respect to the blend ratio between the component B and the component D, the component B is, with respect to 100 parts by mass of the component D, preferably 0.5 to 15 parts by mass, and more preferably 2 to 7 parts by mass.

(C) An Organotitanium

According to at least one embodiment, the component C is a component to aid the function of the component B. From the viewpoint of largely improving the abrasion resistance of a hard coat, the component B and the component C exhibit specific favorable affinity. Further the component C itself chemically bonds with or strongly interacts with the component D and the like, and serves to enhance the abrasion resistance of a hard coat.

Examples of the organotitanium include tetra-i-propoxytitanium, tetra-n-butoxytitanium, tetrakis(2-ethylhexyloxy)titanium, titanium-i-propoxyoctylene glycolate, di-i-propoxytitanium bis(acetylacetonate), propanedioxytitanium bis(ethylacetoacetate), tri-n-butoxytitanium monostearate, di-i-propoxytitanium distearate, titanium stearate, di-i-propoxytitanium diisostrearate, (2-n-butoxycarbonylbenzoyloxy)tributoxytitanium and di-n-butoxy-bis(triethanolaminato)titanium; and polymers composed of one or more thereof. The component C can be used singly or as a mixture of two or more thereof.

Among these, tetra-i-propoxytitanium, tetra-n-butoxytitanium and tetrakis(2-ethylhexyloxy)titanium and titanium-i-propoxyoctylene glycolate being alkoxytitaniums are preferable from the viewpoint of the abrasion resistance and the color tone.

According to at least one embodiment, the blend amount of the component C may be, from the viewpoint of the abrasion resistance, with respect to 100 parts by mass of the component A, 0.05 part by mass or larger, preferably 0.1 part by mass or larger, and more preferably 0.2 part by mass or larger. On the other hand, from the viewpoint of the color tone, the blend amount of the component C may be 3 parts by mass or smaller, preferably 2 parts by mass or smaller, and more preferably 1.5 parts by mass or smaller.

Further from the viewpoint of effectively aiding the function of the component B, with respect to the blend ratio between the component B and the component C, the component C is, with respect to 100 parts by mass of the component B, preferably 5 to 150 parts by mass. It is more preferably 20 to 80 parts by mass.

(D) Microparticles Having an Average Particle Diameter of 1 to 300 nm

According to at least one embodiment, the component D serves to improve the surface hardness of a hard coat. However, the component D has weak interaction with the component A, and causes the abrasion resistance to become insufficient. In at least one embodiment, by using the component B capable of chemically bonding with or strongly interacting with both the component A and the component D, and the component C aiding the function of the component B, this problem comes to be solved.

Therefore, the component D is preferably a substance capable of chemically bonding with or strongly interacting with the component B, and more preferably a substance capable of chemically bonding with or strongly interacting with the component B and the component C. As the component D, there can be used either of inorganic microparticles and an organic microparticles. Examples of the inorganic microparticles include silica (silicon dioxide); metal oxide microparticles such as aluminum oxide, zirconia, titania, zinc oxide, germanium oxide, indium oxide, tin oxide, indium tin oxide, antimony oxide and cerium oxide; metal fluoride microparticles such as magnesium fluoride and sodium fluoride; metal sulfide microparticles; metal nitride microparticles; and metal microparticles. Examples of the organic microparticle include resin beads of styrene resins, acrylic resins, polycarbonate resins, ethylene resins, cured resins of an amino compound with formaldehyde, and the like. These can be used singly or in a combination of two or more.

Any in the group of these substances exemplified as the component D can be believed to be at least a substance capable of chemically bonding with or strongly interacting with the component B.

Further for the purpose of enhancing the dispersibility of the microparticles in a coating material or enhancing the surface hardness of an obtained hard coat, there may be used the microparticles treated on the surface thereof with a surface treating agent, e.g., a silane coupling agent such as vinylsilane or aminosilane; a titanate coupling agent; an aluminate coupling agent; an organic compound having a reactive functional group such as an ethylenic unsaturated bond group such as a (meth)acryloyl group, a vinyl group and an allyl group, or an epoxy group; a fatty acid; a fatty acid metal salt; or the like.

Among these, in order to obtain a hard coat having a higher surface hardness, microparticles of silica and aluminum oxide are preferable, and microparticles of silica are more preferable. Commercially available silica microparticles include Snowtex (trade name), available from Nissan Chemical Industries, Ltd, and Quattron (trade name), available from Fuso Chemical Co., Ltd.

According to at least one embodiment, the average particle diameter of the component D is 300 nm or smaller from the viewpoint of holding the transparency of a hard coat and from the viewpoint of securely attaining the effect of improving the surface hardness of the hard coat. The average particle diameter of the component D is preferably 200 nm or smaller, and more preferably 120 nm or smaller. Meanwhile, there is especially no reason for restricting the lower limit of the average particle diameter of the component D, but usually available microparticles are ones of about 1 nm at the finest.

Here, in the present description, the average particle diameter of a microparticle is a particle diameter at which the cumulation from the smaller side of the particle diameter becomes 50% by mass in a particle diameter distribution curve measured using a laser diffraction/scattering particle size analyzer "MT3200II" (trade name), available from Nikkiso Co., Ltd.

The blend amount of the component D may be, from the viewpoint of the surface hardness, with respect to 100 parts by mass of the component A, 5 parts by mass or larger, and preferably 20 parts by mass or larger. On the other hand, from the viewpoint of the abrasion resistance and the transparency, the blend amount of the component D may be 100 parts by mass or smaller, preferably 70 parts by mass or smaller, and more preferably 50 parts by mass or smaller.

(E) A Water Repellant

It is preferable from the viewpoint of enhancing the finger slidability, the fouling-preventive property and the fouling wiping-off property that the active energy ray-curable resin composition further comprises 0.01 to 7 parts by mass of (E) a water repellant.

Examples of the water repellant include wax water repellants such as paraffin wax, polyethylene wax and acrylethylene copolymer waxes; silicone water repellants such as silicone oils, silicone resins, polydimethylsiloxane and alkylalkoxysilanes; and fluorine-containing water repellants such as fluoropolyether water repellants and fluoropolyalkyl water repellants. The component E can be used singly or as a mixture of two or more thereof.

Among these, the component E is, from the viewpoint of the water-repellent performance, preferably a fluoropolyether water repellant. From the viewpoint of preventing trouble such as bleedout of the component E by the chemical bond of or the strong interaction of the component A or the component B with the component E, as the component E, a water repellant (hereinafter, abbreviated as a (meth)acryloyl group-containing fluoropolyether water repellant) is more preferable which comprises a compound containing a (meth)acryloyl group and a fluoropolyether group in its molecule.

Further, as the component E, from the viewpoint of suitably controlling the chemical bond of or the strong interaction of the component A or the component B with the component E, and highly holding the transparency and simultaneously developing good water repellency, there may be used a mixture of an acryloyl group-containing fluoropolyether water repellant and a methacryloyl group-containing fluoropolyether water repellant.

According to at least one embodiment, the blend amount of the component E in the case where the component E is used may be, from the viewpoint of preventing trouble such as bleedout of the component E, with respect to 100 parts by mass of the component A, usually 7 parts by mass or smaller, and preferably 4 parts by mass or smaller. The lower limit of the blend amount of the component E is not especially set, since the component E is an optional component, but from the viewpoint of attaining the desired effect of using the component E, may be usually 0.01 part by mass or larger, preferably 0.05 parts by mass or larger, and more preferably 0.1 part by mass or larger.

According to at least one embodiment, the active energy ray-curable resin composition comprising the above components A to D, preferably the above components A to E, from the viewpoint of making good the curability by active energy rays, preferably further comprises a compound having two or more isocyanate groups (—N=C=O) in one molecule thereof and/or a photopolymerization initiator. The description of either thereof has been made in the above.

According to at least one embodiment, the active energy ray-curable resin composition may comprise, as desired, one or two or more of additives such as antistatics, surfactants, leveling agents, thixotropy imparting agents, anti-fouling agents, printability improvers, antioxidants, weather resistance stabilizers, light resistance stabilizers, ultraviolet absorbents, thermal stabilizers, colorants and fillers.

According to at least one embodiment, the active energy ray-curable resin composition may comprise, in order to be diluted to a concentration facilitating coating, as desired, a solvent. The solvent is not especially limited unless reacting with the components in the composition or catalyzing (or promoting) self-reactions (including deteriorative reactions) of these components. Examples of the solvent include 1-methoxy-2-propanol, ethyl acetate, n-butyl acetate, toluene, methyl ethyl ketone, methyl isobutyl ketone, diacetone alcohol and acetone.

According to at least one embodiment, the active energy ray-curable resin composition can be obtained by mixing and stirring these components.

A method for forming the (δ) hard coat layer by using a coating material for forming the hard coat comprising the active energy ray-curable resin composition is not especially limited, and a known web applying method can be used. The method specifically includes methods such as roll coating, gravure coating, reverse coating, roll brushing, spray coating, air knife coating and die coating.

The thickness of the (δ) hard coat layer is not especially limited, but may be, from the viewpoint of the rigidity, the heat resistance and the dimensional stability of the pressure-sensitive adhesive film according to various embodiments, usually 1 μm or larger, preferably 5 μm or larger, more preferably 10 μm or larger, and still more preferably 15 μm or larger. Further the thickness may be, from the viewpoint of the cutting suitability and the web handleability, preferably 100 μm or smaller, and more preferably 50 μm or smaller.

According to at least one embodiment, the pressure-sensitive adhesive film has a total light transmittance (as measured according to JIS K7361-1:1997 by using a turbidimeter "NDH2000" (trade name) of Nippon Denshoku Industries Co., Ltd.) of 80% or higher. The pressure-sensitive adhesive film according to various embodiments, when having a total light transmittance of 80% or higher, can suitably be used as an image display apparatus member. A higher total light transmittance is preferable; and the total light transmittance is preferably 85% or higher, more preferably 88% or higher, and still more preferably 90% or higher.

According to at least one embodiment, the pressure-sensitive adhesive film has a yellowness index (as measured according to JIS K7105:1981 by using a chromaticity meter "SolidSpec-3700" (trade name) of Shimadzu Corp.) of preferably 3 or lower, more preferably 2 or lower and still more preferably 1 or lower. A lower yellowness index is preferable. The pressure-sensitive adhesive film according to various embodiments, when having such a low yellowness index, can suitably be used as an image display apparatus member.

EXAMPLES

Hereinafter, various embodiments will be described by way of Examples, but the various embodiments are not limited thereto.

Measurement and Evaluation Methods of Physical Properties (i) Air Bleedability

A test piece having a size of 30 cm in length by 20 cm in width was sampled from the pressure-sensitive adhesive film so that the machine direction of the poly(meth)acrylimide resin film constituting the layer ($\alpha$) of the pressure-sensitive adhesive film coincided with the longitudinal direction of the test piece. The test piece was pasted by hand from one end part thereof in the width direction toward the longitudinal direction on a glass plate (a float glass of 3 mm in thickness prescribed in JIS R3202:2011 of K.K. Test Piece) left standing on a table. The state of bubble entrainment and the presence/absence of appearance defects such as bulge at this time were visually observed, and evaluated according to the following criteria.

○ (good): There were observed no bulges due to bubble entrainment.

Δ (slightly poor): There were observed bulges due to bubble entrainment. However, by scraping the film from thereon by finger, bubbles were easily squeezed out and the bulges could be eliminated.

× (poor): There were observed bulges due to bubble entrainment. Moreover, even by scraping the film from thereon by finger, there were bulges whose bubbles could not be squeezed out and eliminated.

(ii) Heat Cycle Reliability

A sample in which the pressure-sensitive adhesive film was pasted on the glass plate as in the above test (i) was used and subjected to a 13-cycle treatment using a thermal shock tester (having no humidity control mechanism) in which one cycle was such that the sample was exposed to an environment of a temperature of −40° C. for 30 min and then exposed to an environment of 80° C. for 30 min. After the treatment, the sample was visually observed and evaluated according to the following criteria.

○ (good): There were observed no liftings (portions where the pressure-sensitive adhesive film had peeled from the glass plate) of the pressure-sensitive adhesive film from the glass plate (i.e., no portions where the pressure-sensitive adhesive film had peeled from the glass plate from the glass plate).

Δ (slightly poor): There were observed liftings of the pressure-sensitive adhesive film from the glass plate, on end parts of the pressure-sensitive adhesive film.

× (poor): There were observed liftings of the pressure-sensitive adhesive film from the glass plate over the whole.

(iii) Appearance Sustainability at Peeling

The pressure-sensitive adhesive film was pasted on the glass plate as in the above test (i), and thereafter, was pulled and peeled off from the glass plate by hand, and evaluated according to the following criteria.

○ (good): The film could easily be peeled without any adhesive residue being left. No breakage nor plastic deformation was caused on the film.

Δ (slightly poor): The film could be peeled without any adhesive residue being left. However, breakage and plastic deformation were caused on the film.

× (poor): Adhesive residue was left when the film was peeled. Further, breakage and plastic deformation were caused on the film.

(iv) Total Light Transmittance

The total light transmittance of the pressure-sensitive adhesive film was measured according to JIS K7361-1:1997 by using a turbidimeter "NDH2000" (trade name) of Nippon Denshoku Industries Co., Ltd.

(v) Yellowness Index

The yellowness index of the pressure-sensitive adhesive film was measured according to JIS K7105:1981 by using a chromaticity meter "SolidSpec-3700" (trade name) of Shimadzu Corp. When the yellowness index was 3 or lower, the case could be evaluated as being good; when higher than 3 and 4 or lower, as being slightly good; and when higher than 4, as being poor.

Raw Materials Used ($\alpha$) Poly(meth)acrylimide Resin Films ($\alpha$-1): A coextrusion film-forming apparatus of a configuration illustrated as a conceptual view in FIG. 1 was used; a poly(meth)acrylimide "PLEXIMID TT70" (trade name) of Evonik Degussa GmbH was extruded from an extruder 1 to make both outer layers (an $\alpha$1 layer and an $\alpha$2 layer) for a transparent multilayer film and an aromatic polycarbonate "Calibre 301-4" (trade name) of Sumika Stryron Polycarbonate Ltd. was extruded from an extruder 2 to make a middle layer (a $\beta$ layer) for the transparent multilayer film; and a melted film 4 for the transparent multilayer film in which the $\alpha$1 layer, the $\beta$ layer and the $\alpha$2 layer were directly laminated in this order was continuously extruded from a coextrusion T die 3 of two-kind three-layer multi-manifold type; and the melted film 4 was fed and charged and pressed between a rotating mirror-finished roll 5 and a mirror-finished belt 6 circulating along the outer peripheral surfaces of a pair of belt rollers 7 so that the $\alpha$1 layer directed to the mirror-finished roll 5 side, by which the transparent multilayer film of 125 μm in total thickness, 40 μm in the $\alpha$1 layer thickness, 45 μm in the $\beta$ layer thickness and 40 μm in the $\alpha$2 layer thickness, having good surface appearance, was obtained. The set conditions at this time were such that the drying temperature before the film formation was 150° C. for the ($\alpha$-1) and 100° C. for $\beta$-1); the set temperatures of the extruder 1 were C1/C2/C3/C4/C5/AD=260/290 to 290° C.; the set temperatures of the extruder 2 were C1/C2/C3/C4/C5/C6/AD=260/280/280/260 to 260/270° C.; both of the extruders 1 and 2 was purged with nitrogen, and used a vacuum vent; the set temperature of the T die 3 was 300° C., and the lip opening was 0.3 mm; the set temperature of the mirror-finished roll 5 was 130° C.; the set temperature of the mirror-finished belt 6 was 120° C., and the pressure was 1.4 MPa; and the taking-up velocity was 9.8 m/min. The total light transmittance, the haze and the yellowness index of the obtained transparent multilayer film were measured. The results are shown in Table 1.

($\alpha$-2) to ($\alpha$-12): A transparent multilayer film having good surface appearance was obtained as in the above ($\alpha$-1), except for altering one or more of the temperature of the mirror-finished roll 5, the temperature of the mirror-finished belt 6 and the thickness of the each layer to those indicated in Table 1 or Table 2. The total light transmittance, the haze and the yellowness index of the obtained transparent multilayer film were measured. The results are shown in Table 1 or Table 2.

(α-13): A transparent multilayer film having good surface appearance was obtained as in the above (α-1), except for altering the total thickness to 500 μm, the layer thickness of the α1 layer to 80 μm, the layer thickness of the β layer to 340 μm, and the layer thickness of the α2 layer to 80 μm, and making the taking-up velocity to be 3.3 m/min and the lip opening to be 1 mm. The total light transmittance, the haze and the yellowness index of the obtained transparent multilayer film were measured. The results are shown in Table 2.

(α-14): By using a poly(meth)acrylimide "PLEXIMID TT70" (trade name) of Evoni Degussa GmbH and by using an apparatus equipped with a 50-mm extruder (installed with a W flight screw of L/D=29 and CR=1.86), a T die of 680 mm in die width, and a taking-up machine having a mechanism of pressing a melted film between a mirror-finished roll (first mirror-finished body) and a mirror-finished belt (second mirror-finished body), a film having good surface appearance and a thickness of 125 μm was obtained. The set conditions at this time were such that the set temperatures of the extruder were C1/C2/C3/AD=280/300/320/320° C.; the set temperature of the T die was 320° C.; the lip opening of the T die was 0.3 mm; the set temperature of the mirror-finished roll was 130° C.; the set temperature of the mirror-finished belt was 120° C.; the pressure of the mirror-finished belt was 1.4 MPa; and the taking-up velocity was 8.7 m/min. The total light transmittance, the haze and the yellowness index of the obtained film were measured. The results are shown in Table 2.

(γ) A Pressure-Sensitive Adhesive (γ-1) was obtained by mixing and stirring 100 parts by mass of an addition reaction-type silicone pressure-sensitive adhesive "KR-3704" (trade name) of Shin-Etsu Chemical Co., Ltd., 0.5 part by mass of a platinum-compound addition-reaction catalyst "CAT-PL-50T" (trade name) of Shin-Etsu Chemical Co., Ltd., and 20 parts by mass of toluene.

Example 1

The above (γ-1) was applied on one surface of the above (γ-1) by using an applicator so that the thickness after the curing became 30 μm, and cured under heating of the condition of at 130° C. for 1 min, by which a pressure-sensitive adhesive film was obtained. The pressure-sensitive adhesive film was subjected to the above tests (i) to (v). The results are shown in Table 1.

Examples 2 to 14

Fabrications of pressure-sensitive adhesive films, and measurements and evaluations of physical properties thereof were carried out wholly as in Example 1, except for using the poly(meth)acrylimide resin films indicated in Table 1 or Table 2 in place of the above (α-1) film. The results are shown in Table 1 or Table 2.

TABLE 1

|   |   | Example 1 | Example 2 | Example 3 | Example 4 | Example 5 | Example 6 | Example 7 |
|---|---|---|---|---|---|---|---|---|
| α Layer | Type of α Layer | α-1 | α-2 | α-3 | α-4 | α-5 | α-6 | α-7 |
|  | Temperature of Mirror-finished Roll ° C. | 130 | 140 | 130 | 130 | 130 | 130 | 130 |
|  | Temperature of Mirror-finished Belt ° C. | 120 | 130 | 120 | 120 | 120 | 120 | 75 |
|  | Total Thickness of α Layer μm | 125 | 125 | 125 | 125 | 125 | 125 | 125 |
|  | Thickness of α1 Layer μm | 40 | 40 | 50 | 45 | 35 | 20 | 40 |
|  | Thickness of β Layer μm | 45 | 45 | 25 | 35 | 55 | 85 | 45 |
|  | Thickness of α2 Layer μm | 40 | 40 | 50 | 45 | 35 | 20 | 40 |
|  | Total Light Transmittance % | 93 | 93 | 93 | 93 | 93 | 93 | 93 |
|  | Haze % | 0.3 | 0.3 | 0.3 | 0.3 | 0.3 | 0.4 | 0.6 |
|  | Yellowness Index | 0.6 | 0.6 | 0.5 | 0.5 | 0.7 | 0.8 | 0.6 |
| Evaluation Results | Air Bleedability | ○ | ○ | ○ | ○ | ○ | ○ | ○ |
|  | Heat Cycle Reliability | ○ | ○ | ○ | ○ | ○ | ○ | ○ |
|  | Appearance Sustainability at Peeling | ○ | ○ | ○ | ○ | ○ | ○ | ○ |
|  | Total Light Transmittance % | 91 | 91 | 91 | 91 | 91 | 91 | 91 |
|  | Yellowness Index | 0.5 | 0.5 | 0.4 | 0.4 | 0.6 | 0.7 | 0.5 |

TABLE 2

|   |   | Example 8 | Example 9 | Example 10 | Example 11 | Example 12 | Example 13 | Example 14 |
|---|---|---|---|---|---|---|---|---|
| α Layer | Type of α Layer | α-8 | α-9 | α-10 | α-11 | α-12 | α-13 | α-14 |
|  | Temperature of Mirror-finished Roll ° C. | 130 | 160 | 110 | 130 | 75 | 130 | 130 |

TABLE 2-continued

|  |  | Example 8 | Example 9 | Example 10 | Example 11 | Example 12 | Example 13 | Example 14 |
|---|---|---|---|---|---|---|---|---|
|  | Temperature of Mirror-finished Belt ° C. | 40 | 140 | 75 | 10 | 40 | 120 | 120 |
|  | Total Thickness of α Layer μm | 125 | 125 | 125 | 125 | 125 | 500 | 125 |
|  | Thickness of α1 Layer μm | 40 | 40 | 40 | 40 | 40 | 80 | single layer |
|  | Thickness of β Layer μm | 45 | 45 | 45 | 45 | 45 | 340 |  |
|  | Thickness of α2 Layer μm | 40 | 40 | 40 | 40 | 40 | 80 |  |
|  | Total Light Transmittance % | 93 | 93 | 92 | 90 | 88 | 92 | 93 |
|  | Haze % | 0.9 | 0.2 | 1.2 | 1.8 | 2.1 | 0.5 | 0.3 |
|  | Yellowness Index | 0.6 | 0.6 | 0.6 | 0.6 | 0.6 | 0.8 | 0.5 |
| Evaluation Results | Air Bleedability | ○ | ○ | ○ | ○ | ○ | ○ | ○ |
|  | Heat Cycle Reliability | ○ | ○ | ○ | ○ | ○ | ○ | ○ |
|  | Appearance Sustainability at Peeling | ○ | ○ | ○ | ○ | ○ | ○ | ○ |
|  | Total Light Transmittance % | 91 | 91 | 90 | 88 | 86 | 90 | 91 |
|  | Yellowness Index | 0.5 | 0.5 | 0.5 | 0.5 | 0.5 | 0.7 | 0.4 |

From the results of Table 1 and Table 2, the pressure-sensitive adhesive films according to various embodiments developed suitable physical properties as a protection film of a display face plate.

Measurement Methods (vi) Water Contact Angle (Initial Water Contact Angle)

For the hard coat surface of the pressure-sensitive adhesive film, the water contact angle was measured by using an automated contact angle meter "DSA20" (trade name) of KRUSS GmbH and by using a method of calculating the water contact angle from a width and a height of a water droplet (see JIS R3257:1999).

(vii) Abrasion Resistance (Water Contact Angle after Cotton Wiping)

A test piece of a size of 150 mm in length and 50 mm in width was sampled from the poly(meth)acrylimide resin film constituting the (α) layer of the pressure-sensitive adhesive film so that the machine direction thereof coincided with the longitudinal direction of the test piece, and was placed on a Gakushin tester according to JIS L0849 so that the hard coat surface directed to surface; then, a stainless steel plate (10 mm in length, 10 mm in width, 1 mm in thickness) covered with a four-stacked-sheet gauze (medical type 1 gauze of Kawamoto Corp.) was attached to a friction terminal of the Gakushin tester, and set so that the length and width surface of the stainless steel plate was brought into contact with the test piece. A load of 350 g was mounted on the stainless steel plate covered with the gauze; and the hard coat surface of the test piece was rubbed 20,000 times reciprocatingly under the conditions of a moving distance of the friction terminal of 60 mm and a speed of one reciprocation/sec; and thereafter, the water contact angle of the cotton-wiped portion was measured according to the method of the above (vi). When the water contact angle was 100° or larger, the abrasion resistance was judged as good. Further when the water contact angle after the 20,000-times reciprocation was smaller than 100°, the measurements in which the number of times of the reciprocation was altered to 15,000 times and 10,000 times were further carried out; and the abrasion resistance was evaluated according to the following criteria.

⊚ (very good): Even after 20,000 times of the reciprocation, the water contact angle was 100° or larger.

○ (good): After 15,000 times of the reciprocation, the water contact angle was 100° or larger, but after 20,000 times of the reciprocation, the water contact angle was smaller than 100°.

× (slightly poor): After 10,000 times of the reciprocation, the water contact angle was 100° or larger, but after 15,000 times of the reciprocation, the water contact angle was smaller than 100°.

× (poor): After 10,000 times of the reciprocation, the water contact angle was smaller than 100°.

(viii) Finger Slidability

The finger slidability was evaluated according to impressions of whether or not the hard coat surface of the pressure-sensitive adhesive film could be desiredly rubbed when being rubbed up and down and right and left or circularly by a forefinger. The test was carried out by 10 test members each, and the case where the test piece could be desiredly rubbed was determined to have scored 2 points; the case where the test piece could be almost desiredly rubbed, 1 point; and the case where the test piece could not be desiredly rubbed including that the finger was caught or otherwise, 0 point, and points of all the test members were totalized and the evaluation was carried out according to the following criteria.

⊚ (good): 16 to 20 points
Δ (slightly poor): 10 to 15 points
Δ (poor): 0 to 9 points (ix) Finger Slidability after Cotton Wiping The test and evaluation of the finger slidability after cotton wiping were carried out as in the above (viii) finger slidability, except for using as a sample the pressure-sensitive adhesive film after the 20,000-times reciprocating cotton wiping according to the method of the above (vii).

(x) Abrasion Resistance (Steel Wool Resistance)

The pressure-sensitive adhesive film was placed on the Gakushin tester of JIS L0849 so that the hard coat surface directed to outer surface. Then, a #0000 steel wool was attached to a friction terminal of the Gakushin tester; thereafter, a load of 500 g was mounted; and the surface of the test piece was rubbed 100 times reciprocatingly. The surface was visually observed, and the abrasion resistance (steel wool resistance) was evaluated according to the following criteria.

⊚ (very good): there was no scratches.
○ (good): there was 1 to 5 scratches.
Δ (slightly poor): there was 6 to 10 scratches.
× (poor): there was 11 or more scratches.

(xi) Linear Expansion Coefficient

The linear expansion coefficient was measured according to JIS K7197:1991. The measurement used a thermomechanical analyzer (TMA) "EXSTAR6000" (trade name) of Seiko Instruments Inc. The test piece had a size of 20 mm in length and 10 mm in width, and was sampled so that the machine direction (MD) of the film became the longitudinal direction of the test piece. The condition regulation of the test piece was carried out at a temperature of 23° C.±2° C. and a relative humidity of 50±5% for 24 hours; and for the purpose of measuring the dimensional stability as a value of a physical property of the film, the condition regulation at the highest temperature in the measurement was not carried out. The interchuck distance was made to be 10 mm; and the temperature program was made to be such that the test piece was held at a temperature of 20° C. for 3 min, and thereafter heated at a temperature-rise rate of 5° C./min up to 270° C. The linear expansion coefficient was calculated from a temperature-test piece length curve acquired under the condition that the low temperature-side temperature was set at 30° C. and the high temperature-side temperature was set at 250° C. The linear expansion coefficient, when being lower than 20 ppm, can be evaluated as very good; when 20 ppm or higher and lower than 30 ppm, as being good; when 30 ppm or higher and lower than 50 ppm, as being slightly good; and when being 50 ppm or higher, as being poor.

(xii) Minimum Bending Radius

By reference to the bending formability (B method) of JIS K6902, a test piece conditioned at a temperature of 23° C.±2° C. at a relative humidity of 50±5% for 24 hours was obtained. The test piece was folded to form a curved surface at a bending temperature of 23° C.±2° C., with the folding line being directed orthogonally to the machine direction of the poly(meth)acrylimide resin film constituting the layer (α) of the pressure-sensitive adhesive film and with the hard coat surface of the pressure-sensitive adhesive film being directed to the outside. The radius of the front face of the shaping jig having the smallest radius of the front face among shaping jigs with no crack generated was defined as the minimum bending radius.

(xiii) Cutting Processability (State of Cut Curved Lines)

A cut hole of a true circle of 0.5 mm in radius and a cut hole of a true circle of 0.1 mm in radius were provided to the pressure-sensitive adhesive film by using a router machine automatically controlled by a computer. A mill used at this time had four blades each having a cylindrical, round-shaped hard-metal tip and had a nick, and the blade diameter was suitably selected so as to match to the cutting portions. Then, the cutting edge of the cut hole of 0.5 mm in radius was visually or microscopically (100×) observed, and the cutting workability was evaluated according to the following criteria. Similarly, the cutting edge of the cut hole of 0.1 mm in radius was visually or microscopically (100×) observed, and the cutting workability was evaluated according to the following criteria. In each table, the evaluation results are shown as results of the former/the latter in order.

⊚ (very good): No crack or burr was found even in microscopic observation.

○ (good): No crack was found even in microscopic observation but a burr was found.

Δ (slightly poor: No crack was found in visual observation but a crack was found in microscopic observation.

× (poor): A crack was found even in visual observation.

(xiv) Surface Smoothness (Surface Appearance)

While the hard coat surface of the pressure-sensitive adhesive film was irradiated with light of a fluorescent lamp by changing the incident angle in various directions, the surface was visually observed, and the surface smoothness (surface appearance) was evaluated according to the following criteria.

⊚ (very good): the surface exhibited no undulations nor scratches. Even if being looked through closely to the light, there was no impression of cloudiness.

○ (good): when being looked through closely to the light, the surface had recognized portions giving an impression of slight cloudiness.

Δ (slightly poor): when being looked into closely, the surface had slightly recognized undulations and scratches, and also gave an impression of cloudiness.

× (poor): The surface had a large number of recognized undulations and scratches. The surface also gave a definite impression of cloudiness.

(xv) Pencil Hardness

The pencil hardness of the hard coat surface of the pressure-sensitive adhesive film was measured according to JIS K5600-5-4 by using a pencil "UNI" (trade name) of Mitsubishi Pencil Co., Ltd under the condition of a load of 750 g. The pencil hardness, when being 6H or higher, can be evaluated as being good; when being 5H or higher, as being slightly good; and when lower than 5H (4H or lower), as being poor.

Raw Materials Used (A) Polyfunctional (meth)acrylates (A-1) dipentaerythritol hexaacrylate (hexafunctional)

(A-2) ethoxylated trimethylolpropane acrylate (trifunctional)

(B) Compounds having an alkoxysilyl group and a (meth)acryloyl group:

(B-1) "Shin-Etsu Silicone KR-513" (trade name) available from Shin-Etsu Chemical Co., Ltd.

This is a compound represented by the formula: $(—SiO_2RR'—)_n.(—SiO_2RR''—)_m$ wherein R is a methoxy group, R' is an acryloyl group, and R" is a methyl group).

(B-2) "Shin-Etsu Silicone X-40-2655A" (trade name) available from Shin-Etsu Chemical Co., Ltd.

This is a compound represented by the formula: $(—SiO_2RR'—)_n.(—SiO_2RR''—)_m$ wherein R is a methoxy group, R' is a methacryloyl group, and R" is a methyl group).

(B') Comparative components (B'-1) "Shin-Etsu Silicone KBM-403" (trade name) available from Shin-Etsu Chemical Co., Ltd.

This is a compound having an alkoxysilyl group and an epoxy group, and no (meth)acryloyl group).

(B'-2) "Shin-Etsu Silicone KBM-903" (trade name) available from Shin-Etsu Chemical Co., Ltd.

This is a compound having an alkoxysilyl group and an amino group, and no (meth)acryloyl group).

(C) Organotitaniums (C-1) titanium-i-propoxyoctylene glycolate "TOG" (trade name) available from Nippon Soda Co., Ltd.

(C-2) tetrakis(2-ethylhexyloxy)titanium "TOT" (trade name) available from Nippon Soda Co., Ltd.

(C-3) di-i-propoxytitanium bis(acetylacetonate) "T-50" (trade name) available from Nippon Soda Co., Ltd.

(C') Comparative component (C'-1) tetra-n-propoxyzirconium "ZAA" (trade name) available from Nippon Soda Co., Ltd.

(D) Microparticles having an average particle diameter of 1 to 300 nm:

(D-1) silica microparticle having an average particle diameter of 20 nm (E) Water repellants (E-1) an acryloyl group-containing fluoropolyether water repellant "KY-1203" (trade name) available from Shin-Etsu Chemical Co., Ltd.

(E-2) a methacryloyl group-containing fluoropolyether water repellant "FOMBLIN MT70" (trade name) available from Solvay Advanced Polymers L.L.C.

(E-3) an acryloyl group-containing fluoropolyether water repellant "Megafac RS-91" (trade name) available from DIC Corp.

Other optional components:

(F-1) a phenyl ketone photopolymerization initiator (1-hydroxycyclohexyl phenyl ketone) "SB-PI714" (trade name) available from Shuang-Bang Ind. Corp.

(F-2) 1-methoxy-2-propanol (F-3) a surface regulator "BYK-399" (trade name) available from BYK Japan KK (F-4) a hydroxyketone photopolymerization initiator (α-hydroxyalkylphenone) "Irgacure 127" (trade name) available from BASF (ε) Coating material for forming a printing face-side hard coat (ε-1) There was used a coating material obtained by mixing and stirring a blend composition of 65 parts by mass of the (A-1), 35 parts by mass of the (A-2), 1.4 parts by mass of the (B-1), 0.7 parts by mass of the (C-1), 35 parts by mass of the (D-1), 5.3 parts by mass of the (F-1), 95 parts by mass of the (F-2) and 0.5 parts by mass of the (F-3).

(α') Comparative film base materials (α'-1) There was used a biaxially-stretched polyethylene terephthalate film "Diafoil" (trade name) having a thickness of 125 μm of Mitsubishi Plastics, Inc.

(α'-2) There was used an acryl resin film "Technolloy S001G" (trade name) having a thickness of 125 μm of Sumitomo Chemical Co., Ltd.

(α'-3) By using an aromatic polycarbonate "Calibre 301-4" (trade name) of Sumika Stryron Polycarbonate Ltd. and by using an apparatus equipped with a 50-mm extruder (installed with a W flight screw of L/D=29 and CR=1.86), a T die of 680 mm in die width, and a taking-up machine having a mechanism of pressing a melted film between a mirror-finished roll (first mirror-finished body) and a mirror-finished belt (second mirror-finished body), a film having a thickness of 125 μm was obtained. The set conditions at this time were such that the set temperatures of the extruder were C1/C2/C3/AD=280/300/320/320° C.; the set temperature of the T die was 320° C.; the lip opening of the T die was 0.3 mm; the set temperature of the mirror-finished roll was 140° C.; the set temperature of the mirror-finished belt was 120° C., and the pressure of the mirror-finished belt was 1.4 MPa; and the taking-up velocity was 9.0 m/min.

Example 15

A corona discharge treatment was carried out on both surfaces of the (α-1) film, under the condition of a treatment amount of 167 W·min/m² (discharge power: 500 W, length of a discharge electrode: 1 m, line velocity: 3 m/min). Both the surfaces had a wetting index of 64 mN/m. Then, on the surface on the α1 layer side, there was applied a coating material of a blend composition (parts by mass) indicated in Table 3 as a coating material for forming a touch face-side hard coat so that the thickness after curing became 15 μm, by using a die-type coating apparatus; and on the surface of the α2 layer side, there was applied the (ε-1) as a coating material for forming a printing face-side hard coat so that the thickness after curing became 15 μm, by using a die-type coating apparatus, by which a hard coat-laminated film was obtained. Then, on the printing face-side hard coat layer, the (γ-1) pressure-sensitive additive was applied so that the thickness after curing became 30 μm, by using an applicator, and cured under heating of the conditions of at 130° C. for 1 min, by which a pressure-sensitive adhesive film was obtained. The above tests (i) to (xv) were carried out on the obtained pressure-sensitive adhesive film. The results are shown in Table 3.

Examples 16 to 28 and Reference Examples 1 to 7

Fabrications of pressure-sensitive adhesive films, and measurements and evaluations of physical properties thereof were carried out wholly as in Example 15, except for altering the blend compositions of coating materials for forming the touch face-side hard coat to those indicated in one of Tables 3 to 6. The results are shown in one of Tables 3 to 6.

Example 29

Fabrication of a pressure-sensitive adhesive film, and measurements and evaluations of physical properties thereof were carried out wholly as in Example 1, except for altering the blend composition of a coating material for forming a touch face-side hard coat to that indicated in Table 6. The results are shown in Table 6.

Example 30

A corona discharge treatment was carried out on both surfaces of (α-14) film, under the condition of a treatment amount of 167 W·min/m² (discharge power: 500 W, length of a discharge electrode: 1 m, line velocity: 3 m/min). Both the surfaces had a wetting index of 63 mN/m. Then, on one surface, there was applied a coating material of a blend composition indicated in Table 6 as a coating material for forming a touch face-side hard coat so that the thickness after curing became 15 μm, by using a die-type coating apparatus; and on the other surface, there was applied the (ε-1) as a coating material for forming a printing face-side hard coat so that the thickness after curing became 15 μm, by using a die-type coating apparatus, by which a hard coat-laminated film was obtained. Then, on the printing face-side hard coat layer, the (γ-1) pressure-sensitive additive was applied so that the thickness after curing became 30 μm, by using an applicator, and cured under heating of the condition of at 130° C. for 1 min, by which a pressure-sensitive adhesive film was obtained. The above tests (i) to (xv) were carried out on the obtained pressure-sensitive adhesive film. The results are shown in Table 6.

Comparative Example 1

On one surface of (α'-1) film, there was applied a coating material of a blend composition indicated in Table 6 as a coating material for forming a touch face-side hard coat so that the thickness after curing became 15 μm, by using a die-type coating apparatus; and on the other surface, there was applied the (ε-1) as a coating material for forming a printing face-side hard coat so that the thickness after curing became 15 μm, by using a die-type coating apparatus, by which a hard coat laminate was obtained. Then, on the printing face-side hard coat layer, the (γ-1) was applied so that the thickness after curing became 30 μm, by using an applicator, and cured under heating of the condition of at 130° C. for 1 min, to thereby obtain a pressure-sensitive adhesive film. The above tests (i) to (xv) were carried out on the obtained pressure-sensitive adhesive film. The results are shown in Table 6. Here, with respect to the linear expansion coefficient, the shrinkage of the test piece was large and it was impossible to obtain the measurement value.

Comparative Example 2

Fabrication of a pressure-sensitive adhesive film, and measurements and evaluations of physical properties thereof were carried out wholly as in Comparative Example 1, except for using the (α'-2) film in place of the (α'-1) film. The results are shown in Table 6.

Comparative Example 3

Fabrication of a pressure-sensitive adhesive film, and measurements and evaluations of physical properties thereof were carried out wholly as in Comparative Example 1, except for using the (α'-3) film in place of the (α'-1) film. The results are shown in Table 6.

TABLE 3

| | | Example 15 | Example 16 | Example 17 | Example 18 | Example 19 | Reference Example 1 | Reference Example 2 |
|---|---|---|---|---|---|---|---|---|
| Coating Material Blend for Touch Face-Side Hard Coat (parts by mass) | A-1 | 65 | 65 | 65 | 65 | 65 | 65 | 65 |
| | A-2 | 35 | 35 | 35 | 35 | 35 | 35 | 35 |
| | B-1 | 1.4 | 1.4 | 1.4 | 1.4 | 1.4 | 1.4 | 1.4 |
| | C-1 | 0.7 | 0.1 | 0.3 | 1.1 | 1.9 | — | 3.5 |
| | D-1 | 35 | 35 | 35 | 35 | 35 | 35 | 35 |
| | E-1 | 1.6 | 1.6 | 1.6 | 1.6 | 1.6 | 1.6 | 1.6 |
| | E-2 | 0.2 | 0.2 | 0.2 | 0.2 | 0.2 | 0.2 | 0.2 |
| | F-1 | 5.3 | 5.3 | 5.3 | 5.3 | 5.3 | 5.3 | 5.3 |
| | F-2 | 95 | 95 | 95 | 95 | 95 | 95 | 95 |
| Physical Properties Evaluation Results | Air Bleedability | ○ | ○ | ○ | ○ | ○ | ○ | ○ |
| | Heat Cycle Reliability | ○ | ○ | ○ | ○ | ○ | ○ | ○ |
| | Appearance Sustainability at Peeling | ○ | ○ | ○ | ○ | ○ | ○ | ○ |
| | Total Light Transmittance % | 89 | 89 | 89 | 89 | 89 | 89 | 88 |
| | Yellowness Index | 0.4 | 0.4 | 0.4 | 0.6 | 2.0 | 0.4 | 4.5 |
| | Initial Water Contact Angle deg | 110 | 110 | 110 | 110 | 110 | 110 | 110 |
| | Water Contact Angle after Cotton Wiping deg | 109 | 98 | 102 | 109 | 109 | <90 | 109 |
| | Evaluation of Water Contact Angle after Cotton Wiping | ◎ | ○ | ◎ | ◎ | ◎ | Δ | ◎ |
| | Finger Slidability | ◎ | ◎ | ◎ | ◎ | ◎ | ◎ | ◎ |
| | Finger Slidability after Cotton Wiping | ◎ | ○ | ◎ | ◎ | ◎ | X | ◎ |
| | Steel Wool Resistance | ◎ | ◎ | ◎ | ◎ | ◎ | ◎ | ◎ |
| | Linear Expansion Coefficient ppm | 15 | 15 | 15 | 15 | 15 | 15 | 15 |
| | Minimum Bending Radius mm | 25 | 25 | 25 | 25 | 25 | 25 | 25 |
| | Cutting Processability | ◎-○ | ◎-○ | ◎-○ | ◎-○ | ◎-○ | ◎-○ | ◎-○ |
| | Surface Appearance | ◎ | ◎ | ◎ | ◎ | ◎ | ◎ | ◎ |
| | Pencil Hardness | 7H | 6H | 7H | 7H | 7H | 6H | 6H |

TABLE 4

| | | Example 20 | Example 21 | Example 22 | Example 23 | Reference Example 3 | Reference Example 4 |
|---|---|---|---|---|---|---|---|
| Coating Material Blend for Touch Face-Side Hard Coat (parts by mass) | A-1 | 65 | 65 | 65 | 65 | 65 | 65 |
| | A-2 | 35 | 35 | 35 | 35 | 35 | 35 |
| | B-1 | 0.5 | 1.0 | 2.0 | 3.0 | 0.05 | 4.5 |
| | C-1 | 0.7 | 0.7 | 0.7 | 1.1 | 0.7 | 1.9 |
| | D-1 | 35 | 35 | 35 | 35 | 35 | 35 |
| | E-1 | 1.6 | 1.6 | 1.6 | 1.6 | 1.6 | 1.6 |
| | E-2 | 0.2 | 0.2 | 0.2 | 0.2 | 0.2 | 0.2 |
| | F-1 | 5.3 | 5.3 | 5.3 | 5.3 | 5.3 | 5.3 |
| | F-2 | 95 | 95 | 95 | 95 | 95 | 95 |
| Physical Properties Evaluation Results | Air Bleedability | ○ | ○ | ○ | ○ | ○ | ○ |
| | Heat Cycle Reliability | ○ | ○ | ○ | ○ | ○ | ○ |
| | Appearance Sustainability at Peeling | ○ | ○ | ○ | ○ | ○ | ○ |
| | Total Light Transmittance % | 90 | 90 | 90 | 90 | 90 | 89 |
| | Yellowness Index | 0.5 | 0.5 | 0.7 | 1.6 | 0.4 | 2.0 |
| | Initial Water Contact Angle deg | 110 | 110 | 110 | 110 | 110 | 98 |

TABLE 4-continued

|  |  | Example 20 | Example 21 | Example 22 | Example 23 | Reference Example 3 | Reference Example 4 |
|---|---|---|---|---|---|---|---|
|  | Water Contact Angle after Cotton Wiping deg | 100 | 105 | 109 | 109 | <90 | 97 |
|  | Evaluation of Water Contact Angle after Cotton Wiping | ◎ | ◎ | ◎ | ◎ | △ | X |
|  | Finger Slidability | ◎ | ◎ | ◎ | ◎ | ◎ | ◎ |
|  | Finger Slidability after Cotton Wiping | ◎ | ◎ | ◎ | ◎ | X | ○ |
|  | Steel Wool Resistance | ◎ | ◎ | ◎ | ◎ | ◎ | ◎ |
|  | Linear Expansion Coefficient ppm | 15 | 15 | 15 | 15 | 15 | 15 |
|  | Minimum Bending Radius mm | 25 | 25 | 25 | 25 | 25 | 25 |
|  | Cutting Processability | ◎-○ | ◎-○ | ◎-○ | ◎-○ | ◎-○ | ◎-○ |
|  | Surface Appearance | ◎ | ◎ | ◎ | ◎ | ◎ | ◎ |
|  | Pencil Hardness | 6H | 7H | 7H | 7H | 5H | 7H |

TABLE 5

|  |  | Example 24 | Example 25 | Example 26 | Reference Example 5 | Reference Example 6 | Reference Example 7 |
|---|---|---|---|---|---|---|---|
| Coating Material Blend for Touch Face-Side Hard Coat (parts by mass) | A-1 | 65 | 65 | 65 | 65 | 65 | 65 |
|  | A-2 | 35 | 35 | 35 | 35 | 35 | 35 |
|  | B-1 | 1.4 | 1.4 | — | — | — | 1.4 |
|  | B-2 | — | — | 1.4 | — | — | — |
|  | B'-1 | — | — | — | 1.4 | — | — |
|  | B'-2 | — | — | — | — | 1.4 | — |
|  | C-1 | 0.7 | 0.7 | 0.7 | 0.7 | 0.7 | — |
|  | C'-1 | — | — | — | — | — | 0.7 |
|  | D-1 | 10 | 50 | 35 | 35 | 35 | 35 |
|  | E-1 | 1.6 | 1.6 | 1.6 | 1.6 | 1.6 | 1.6 |
|  | E-2 | 0.2 | 0.2 | 0.2 | 0.2 | 0.2 | 0.2 |
|  | F-1 | 5.3 | 5.3 | 5.3 | 5.3 | 5.3 | 5.3 |
|  | F-2 | 95 | 95 | 95 | 95 | 95 | 95 |
| Physical Properties Evaluation Results | Air Bleedability | ○ | ○ | ○ | ○ | ○ | ○ |
|  | Heat Cycle Reliability | ○ | ○ | ○ | ○ | ○ | ○ |
|  | Appearance Sustainability at Peeling | ○ | ○ | ○ | ○ | ○ | ○ |
|  | Total Light Transmittance % | 90 | 88 | 89 | 89 | 89 | 89 |
|  | Yellowness Index | 0.5 | 0.6 | 0.5 | 0.6 | 4.4 | 0.5 |
|  | Initial Water Contact Angle deg | 110 | 110 | 110 | 110 | 110 | 110 |
|  | Water Contact Angle after Cotton Wiping deg | 109 | 108 | 100 | <90 | 105 | <90 |
|  | Evaluation of Water Contact Angle after Cotton Wiping | ◎ | ◎ | ◎ | △ | ◎ | △ |
|  | Finger Slidability | ◎ | ◎ | ◎ | ◎ | ◎ | ◎ |
|  | Finger Slidability after Cotton Wiping | ◎ | ◎ | ◎ | X | ◎ | X |
|  | Steel Wool Resistance | ◎ | ◎ | ◎ | ◎ | ◎ | ◎ |
|  | Linear Expansion Coefficient ppm | 15 | 15 | 15 | 15 | 15 | 15 |
|  | Minimum Bending Radius mm | 25 | 35 | 25 | 25 | 25 | 25 |
|  | Cutting Processability | ◎-○ | ◎-○ | ◎-○ | ◎-○ | ◎-○ | ◎-○ |
|  | Surface Appearance | ◎ | ◎ | ◎ | ◎ | ◎ | ◎ |
|  | Pencil Hardness | 6H | 7H | 6H | 5H | 7H | 6H |

TABLE 6

|  |  | Example 27 | Example 28 | Example 29 | Example 30 | Comparative Example 1 | Comparative Example 2 | Comparative Example 3 |
|---|---|---|---|---|---|---|---|---|
| Coating Material Blend for Touch | A-1 | 65 | 65 | 65 | 65 | 65 | 65 | 65 |
|  | A-2 | 35 | 35 | 35 | 35 | 35 | 35 | 35 |
| Face-Side Hard | B-1 | 1.4 | 1.4 | 1.4 | 1.4 | 1.4 | 1.4 | 1.4 |

TABLE 6-continued

| | | Example 27 | Example 28 | Example 29 | Example 30 | Comparative Example 1 | Comparative Example 2 | Comparative Example 3 |
|---|---|---|---|---|---|---|---|---|
| Coat (parts by mass) | C-1 | — | — | 0.7 | 0.7 | 0.7 | 0.7 | 0.7 |
| | C-2 | 0.7 | — | — | — | — | — | — |
| | C-3 | — | 0.7 | — | — | — | — | — |
| | C'-1 | — | — | — | — | — | — | — |
| | D-1 | 35 | 35 | 35 | 35 | 35 | 35 | 35 |
| | E-1 | 1.6 | 1.6 | — | 1.6 | 1.6 | 1.6 | 1.6 |
| | E-2 | 0.2 | 0.2 | — | 0.2 | 0.2 | 0.2 | 0.2 |
| | E-3 | — | — | 1.6 | — | — | — | — |
| | F-1 | 5.3 | 5.3 | 4.6 | 5.3 | 5.3 | 5.3 | 5.3 |
| | F-2 | 95 | 95 | 95 | 95 | 95 | 95 | 95 |
| | F-4 | — | — | 0.7 | — | — | — | — |
| Physical Properties Evaluation Results | Air Bleedability | ○ | ○ | ○ | ○ | ○ | ○ | ○ |
| | Heat Cycle Reliability | ○ | ○ | ○ | ○ | ○ | ○ | ○ |
| | Appearance Sustainability at Peeling | ○ | ○ | ○ | ○ | ○ | ○ | ○ |
| | Total Light Transmittance % | 89 | 89 | 88 | 89 | 87 | 88 | 88 |
| | Yellowness Index | 2.0 | 2.8 | 0.7 | 0.5 | 0.6 | 0.6 | 0.8 |
| | Initial Water Contact Angle deg | 110 | 110 | 110 | 110 | 110 | 110 | 110 |
| | Water Contact Angle after Cotton Wiping deg | 109 | 109 | 109 | 109 | 109 | 109 | 109 |
| | Evaluation of Water Contact Angle after Cotton Wiping | ◎ | ◎ | ◎ | ◎ | ◎ | ◎ | ◎ |
| | Finger Slidability | ◎ | ◎ | ◎ | ◎ | ◎ | ◎ | ◎ |
| | Finger Slidability after Cotton Wiping | ◎ | ◎ | ◎ | ◎ | ◎ | ◎ | ◎ |
| | Steel Wool Resistance | ◎ | ◎ | ◎ | ◎ | ◎ | ◎ | ◎ |
| | Linear Expansion Coefficient ppm | 15 | 15 | 15 | 12 | unmeasurable | 70 | 80 |
| | Minimum Bending Radius mm | 25 | 25 | 25 | 30 | 20 | 25 | 20 |
| | Cutting Processability | ◎-○ | ◎-○ | ◎-○ | ◎-○ | ◎-○ | ◎-○ | ◎-○ |
| | Surface Appearance | ◎ | ◎ | ◎ | ◎ | ◎ | ◎ | ◎ |
| | Pencil Hardness | 7H | 7H | 7H | 8H | 4H | 6H | 4H |

From the results indicated in Tables 3 to 6, it has been found that the pressure-sensitive adhesive films having the hard coat layer according to various embodiments developed physical properties suitable as a protection film for a display face plate. By contrast, Comparative Example 1 (which comprised no poly(meth)acrylimide resin film layer) was inferior in the heat-resistive dimensional stability (linear expansion coefficient) and insufficient in the surface hardness. Comparative Example 2 (which comprised no poly (meth)acrylimide resin film layer) was insufficient in the heat-resistive dimensional stability. Comparative Example 3 (which comprised no poly(meth)acrylimide resin film layer) was insufficient in the heat-resistive dimensional stability and the surface hardness.

Embodiments provide non-obvious advantages over the conventional The pressure-sensitive adhesive film according to various embodiments is excellent in transparency, color tone and surface appearance, and preferably excellent in abrasion resistance, surface hardness and bending resistance. Further the pressure-sensitive adhesive film according to various embodiments exhibits no bubble entrainment and is good in appearance sustainability at peeling and in tackiness as well. Hence, the pressure-sensitive adhesive film can suitably be used as a display face plate or a protection film for a display face plate.

The invention claimed is:

1. A pressure-sensitive adhesive film, the pressure-sensitive adhesive film comprising:
 (α) a poly(meth)acrylimide resin film layer and (γ) a pressure-sensitive adhesive layer arranged in order from the surface layer side of an article when the pressure-sensitive adhesive film is applied to the article; and
 (δ) a hard coat layer directly on the surface layer side of the (α) poly(meth)acrylimide resin film layer,
 wherein the pressure-sensitive adhesive film has a total light transmittance of 80% or higher,
 wherein the hard coat layer has a thickness of 15 μm or more, and
 wherein the (α) poly(meth)acrylimide resin film is a transparent mulitilayer film comprising:
  a first poly(meth)acrylimide resin layer (α1);
  an aromatic polycarbonate resin layer (β); and
  a second poly(meth)acrylimide resin layer (α2), directly laminated in this order.

2. The pressure-sensitive adhesive film according to claim 1, wherein the (δ) hard coat layer comprises an active energy ray-curable resin composition comprising:
 100 parts by mass of (A) a polyfunctional (meth)acrylate;
 0.2 to 4 parts by mass of (B) a compound having an alkoxysilyl group and a (meth)acryloyl group;
 0.05 to 3 parts by mass of (C) an organotitanium; and
 5 to 100 parts by mass of (D) microparticles having an average particle diameter of 1 to 300 nm.

3. The pressure-sensitive adhesive film according to claim 2, wherein the active energy ray-curable resin composition further comprises 0.01 to 7 parts by mass of (E) a water repellant.

4. The pressure-sensitive adhesive film according to claim 3, wherein the (E) water repellant comprises a (meth) acryloyl group-containing fluoropolyether water repellant.

5. The pressure-sensitive adhesive film according to claim 1, wherein the (a) poly(meth)acrylimide resin film satisfies the following properties (I) and (II):
(I) a total light transmittance of 85% or higher; and
(II) a haze of 3.0% or lower.

6. The pressure-sensitive adhesive film according to claim 1, wherein the (γ) pressure-sensitive adhesive layer comprises a silicone pressure-sensitive adhesive.

7. Use of the pressure-sensitive adhesive film according to claim 1 as an image display apparatus member.

8. An image display apparatus member, comprising the pressure-sensitive adhesive film according to claim 1.

* * * * *